(12) United States Patent
Loehr et al.

(10) Patent No.: US 10,805,858 B2
(45) Date of Patent: Oct. 13, 2020

(54) BEARER MAPPING FOR PROSE RELAY

(71) Applicant: Panasonic Intellectual Property Corporation of America, Torrance, CA (US)

(72) Inventors: Joachim Loehr, Hessen (DE); Prateek Basu Mallick, Hessen (DE); Takako Hori, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 378 days.

(21) Appl. No.: 15/759,184

(22) PCT Filed: Aug. 8, 2016

(86) PCT No.: PCT/JP2016/003635
§ 371 (c)(1),
(2) Date: Mar. 9, 2018

(87) PCT Pub. No.: WO2017/051494
PCT Pub. Date: Mar. 30, 2017

(65) Prior Publication Data
US 2018/0255499 A1 Sep. 6, 2018

(30) Foreign Application Priority Data
Sep. 25, 2015 (EP) .................................... 15186950

(51) Int. Cl.
*H04L 1/00* (2006.01)
*H04W 40/22* (2009.01)
(Continued)

(52) U.S. Cl.
CPC .......... *H04W 40/22* (2013.01); *H04B 7/2606* (2013.01); *H04W 72/1242* (2013.01); *H04W 76/23* (2018.02); *H04W 88/04* (2013.01)

(58) Field of Classification Search
CPC ...................................................... H04W 88/04
See application file for complete search history.

(56) References Cited

U.S. PATENT DOCUMENTS

2009/0010258 A1* 1/2009 Ayoub .................. H04W 72/10
370/392
2012/0099587 A1 4/2012 Fan et al.

OTHER PUBLICATIONS

ZTE Corporation, Priority in UE-to-Network Relay, Aug. 2015, 3GPP TSG-RAN WG2 Meeting #91, pp. 1-3 (Year: 2015).*
(Continued)

*Primary Examiner* — Ayanah S George
(74) *Attorney, Agent, or Firm* — Seed IP Law Group LLP

(57) ABSTRACT

The present disclosure relates to a relay UE for relaying protocol data units between a remote UE and a radio base station. A control packet is received by the relay UE from the remote UE via a first sidelink bearer, comprising a priority indication associated with protocol data units transmitted by the remote user equipment via the first sidelink bearer. The relay UE stores an association between the priority indication and a radio bearer used by the relay UE to relay the protocol data packets. The relay UE determines, based on the stored association, the priority according to which a protocol data unit, received from the base station via the first radio bearer, should be transmitted to the remote UE, and relays the received protocol data unit to the remote user equipment using a second sidelink bearer that corresponds to the determined priority.

14 Claims, 16 Drawing Sheets

(51) Int. Cl.
H04W 76/23 (2018.01)
H04B 7/26 (2006.01)
H04W 72/12 (2009.01)
H04W 88/04 (2009.01)

(56) References Cited

OTHER PUBLICATIONS

Huawei "D2D PDCP Header Format and Procedures" (Year: 2014).*
International Search Report of PCT application No. PCT/JP2016/003635 dated Oct. 25, 2016.
3GPP TSG RAN WG2 #91, R2-153770, "Priority in UE-to-Network relay", Aug. 2015.
SA WG2 #110AH, S2-152864, "Providing QoS in UE-to-NW Relay scenario", Sep. 2015.
3GPP TS 36.211, V12.6.0, "3rd Generation Partnership Project; Technical Specification Group Radio Access Network; Evolved Universal Terrestrial Radio Access (E-UTRA); Physical channels and modulation", Jun. 2015.
3GPP TS 36.321, V12.6.0, "3rd Generation Partnership Project; Technical Specification Group Radio Access Network; Evolved Universal Terrestrial Radio Access (E-UTRA); Medium Access Control (MAC) protocol specification", Jun. 2015.
3GPP TS 23.203, V13.4.0, "3rd Generation Partnership Project; Technical Specification Group Services and System Aspects; Policy and charging control architecture", Jun. 2015.
3GPP TR36.843, V12.0.1, "3rd Generation Partnership Project; Technical Specification Group Radio Access Network; Study on LTE Device to Device Proximity Services; Radio Aspects", Mar. 2014.
3GPP TS 36.300, V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", Mar. 2016.
3GPP TS 36.212, V12.4.0, "3rd Generation Partnership Project; Technical Specification Group Radio Access Network; Evolved Universal Terrestrial Radio Access (E-UTRA); Multiplexing and channel coding", Mar. 2015.
3GPP TS 23.303, V13.0.0, "3rd Generation Partnership Project; Technical Specification Group Services and System Aspects; Proximity-based services (ProSe); Stage 2", Jun. 2015.
3GPP TR 23.713, V1.4.0, "3rd Generation Partnership Project; Technical Specification Group Services and System Aspects; Study on extended architecture support for proximity-based services", Jun. 2015.
3GPP TSG-RAN WG2 #91, R2-153480, "Impact of PPP on user plane", Aug. 2015.
Communication pursuant to Article 94(3) EPC, dated Mar. 15, 2018, for the related European Patent Application No. 15186950.0-1215, 7 pages.
Ericsson: "Impact of PPP on user plane", 3GPP Draft; R2-153480—Impact of PPP on User Plane, 3rd Generation Partnership Project (3GPP), Mobile Competence Centre; 650, Route Des Lucioles; F-06921 Sophia-Antipolis Cedex; France, vol. RAN WG2, No. Beijing, P.R. China; Aug. 24, 2015-Aug. 28, 2015 Aug. 23, 2015 (Aug. 23, 2015), XP051004194, Retrieved from the Internet: URL:http://www.3gpp.org/ftp/Meetings_3GPP_SYNC/RAN2/Docs/ [retrieved on Aug. 23, 2015].
ZTE Corporation: "Priority in UE-to-Network relay", 3GPP Draft; R2-153770—Priority in UE to NW Relay, 3rd Generation Partnership Project (3GPP), Mobile Competence Centre; 650, Route Des Lucioles; F-06921 Sophia-Antipolis Cedex; France, vol. RAN WG2, No. Beijing, P.R.China; Aug. 24, 2015-Aug. 28, 2015 Aug. 23, 2015 (Aug. 23, 2015), XP051004415, Retrieved from the Internet: URL:http://www.3gpp.org/ftp/Meetings_3GPP_SYNC/RAN2/Docs/ [retrieved on Aug. 23, 2015].
3GPP, "3rd Generation Partnership Project; Technical Specification Group Radio Access Network; Evolved Universal Terrestrial Radio Access (E-UTRA); Packet Data Convergence Protocol (PDCP) specification (Release 12)". Technical Specification 36.323, Version 12.4.0, Jun. 2015, 33 pages.
Huawei, HiSilicon, "D2D PDCP Header Format and Procedures" R2-144606, 3GPP TSG RAN WG2 Meeting #87bis, Shanghai, China, Oct. 6-10, 2014, 3 pages.

* cited by examiner

[Fig. 1]
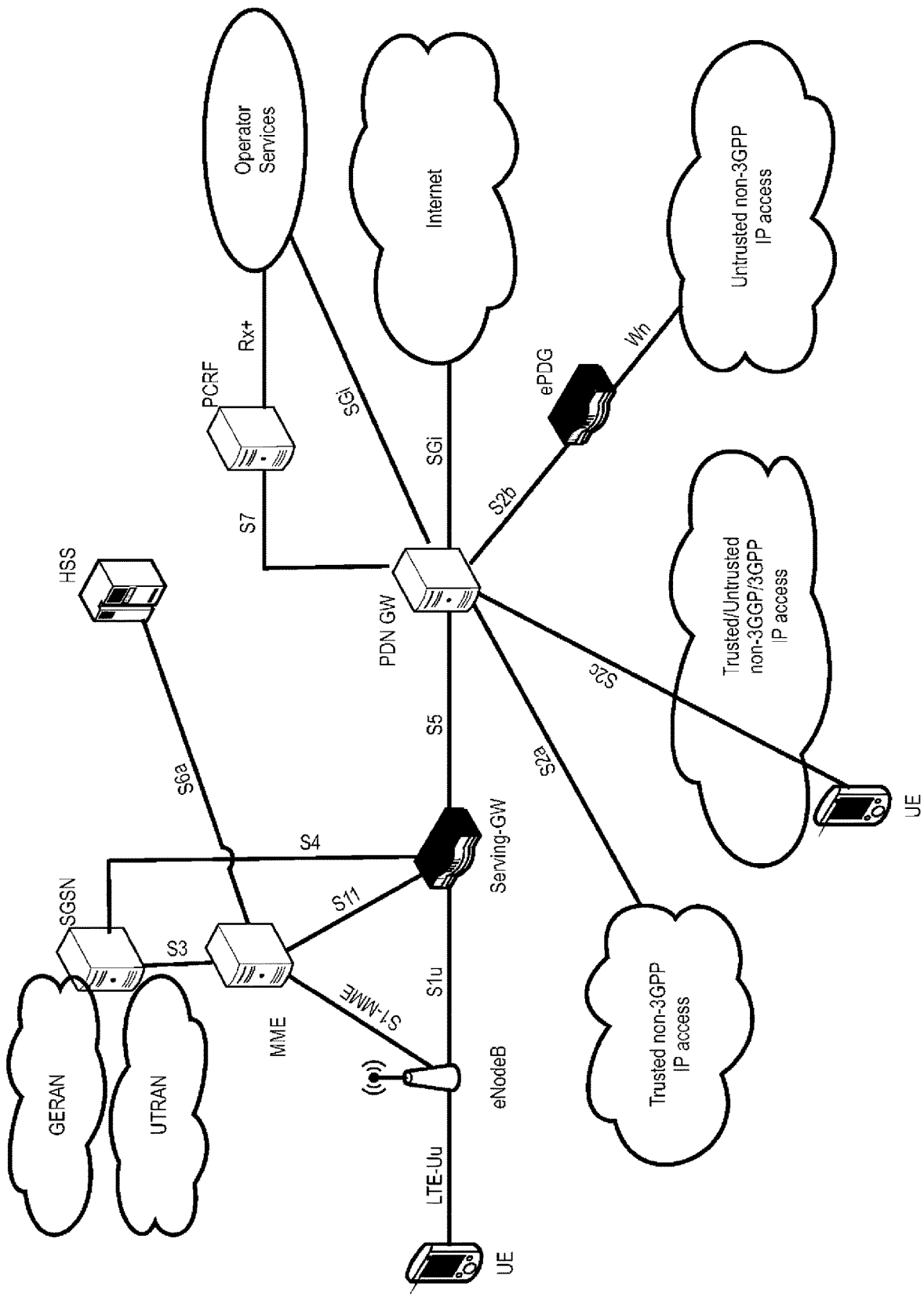

[Fig. 2]
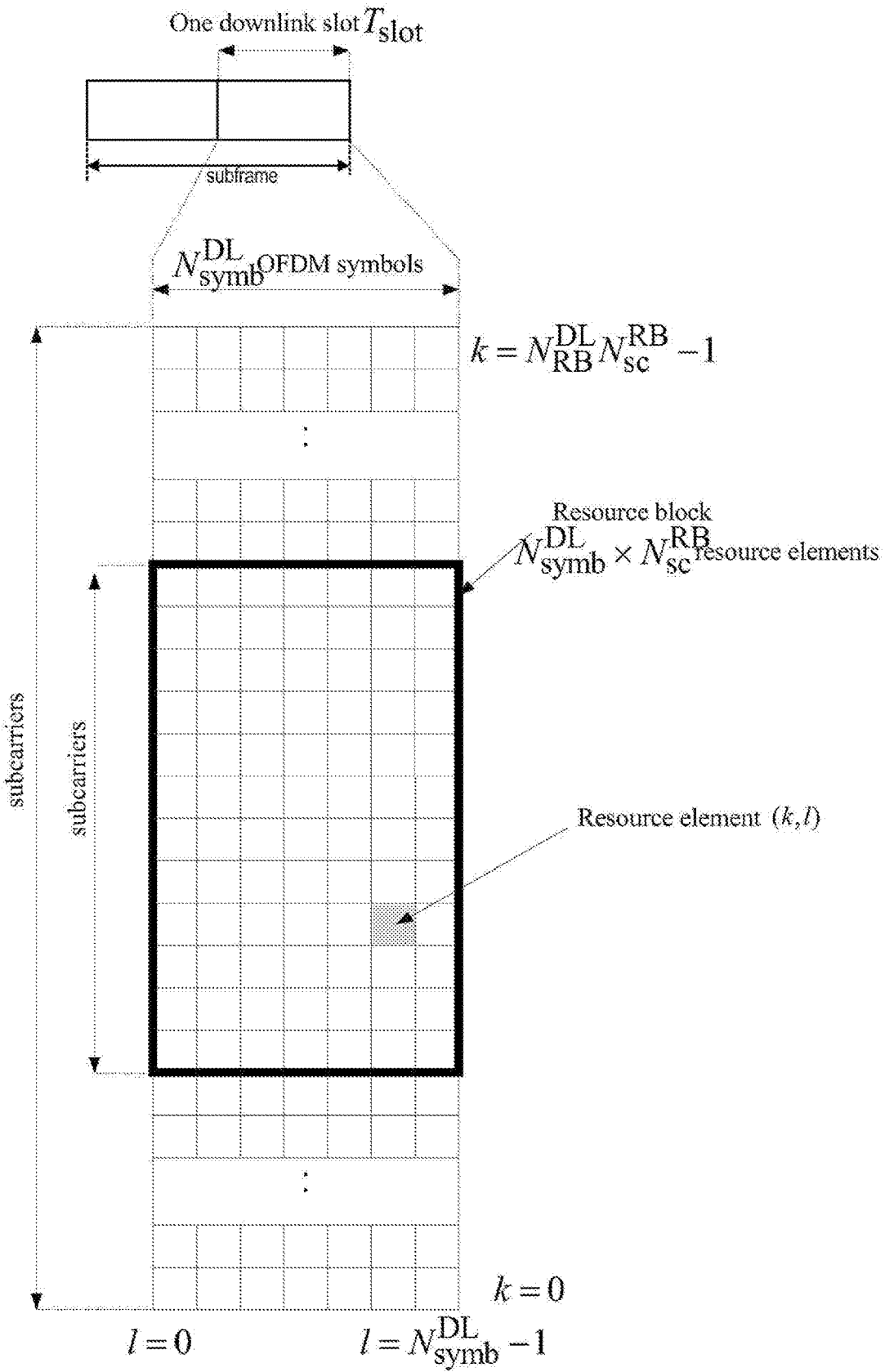

[Fig. 3]
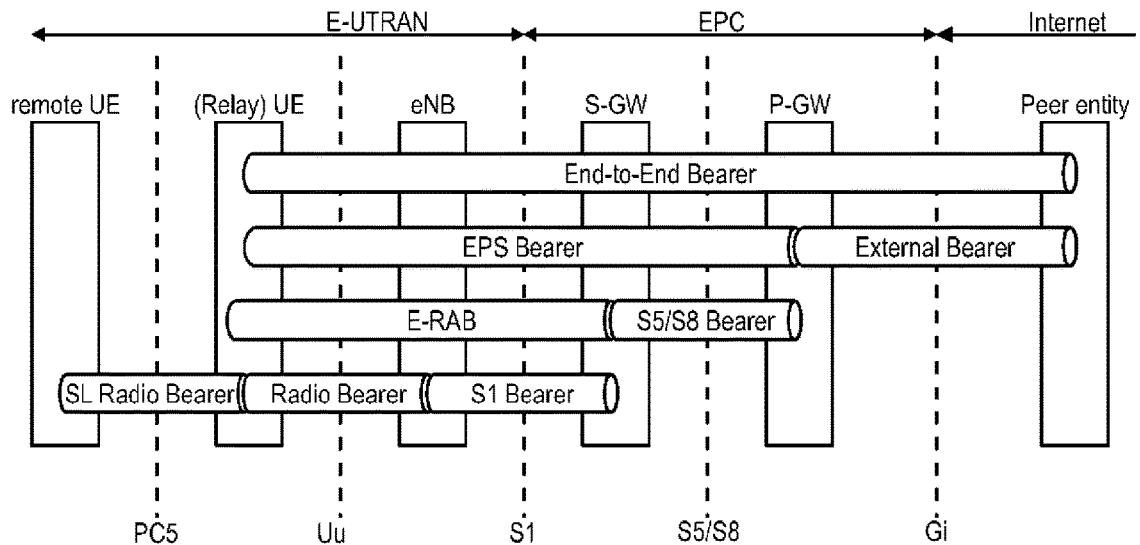
[Fig. 4]
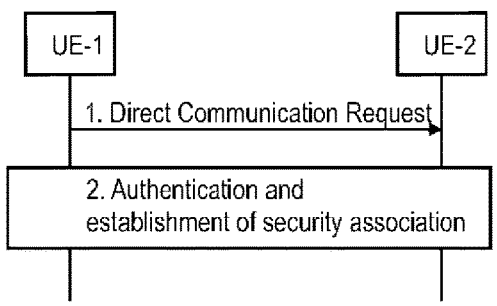
[Fig. 5]
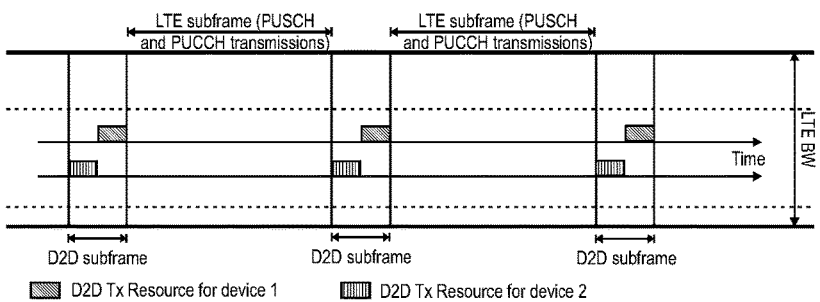

[Fig. 6]
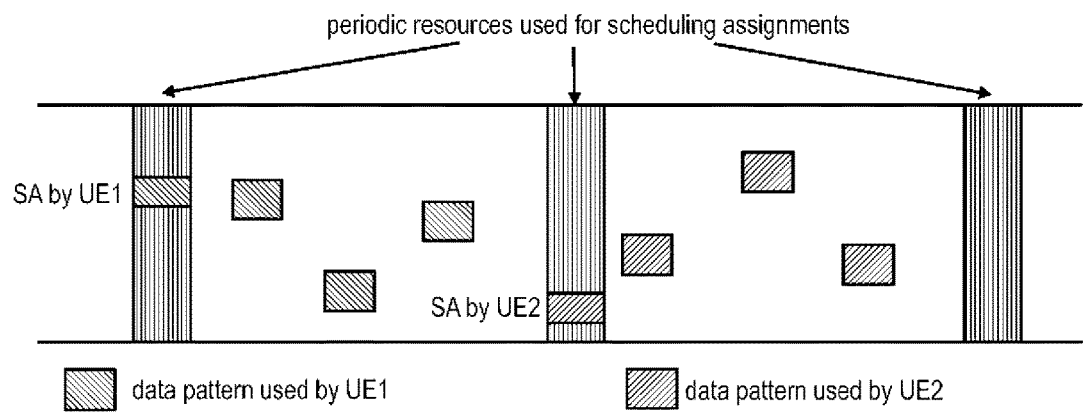
[Fig. 7]
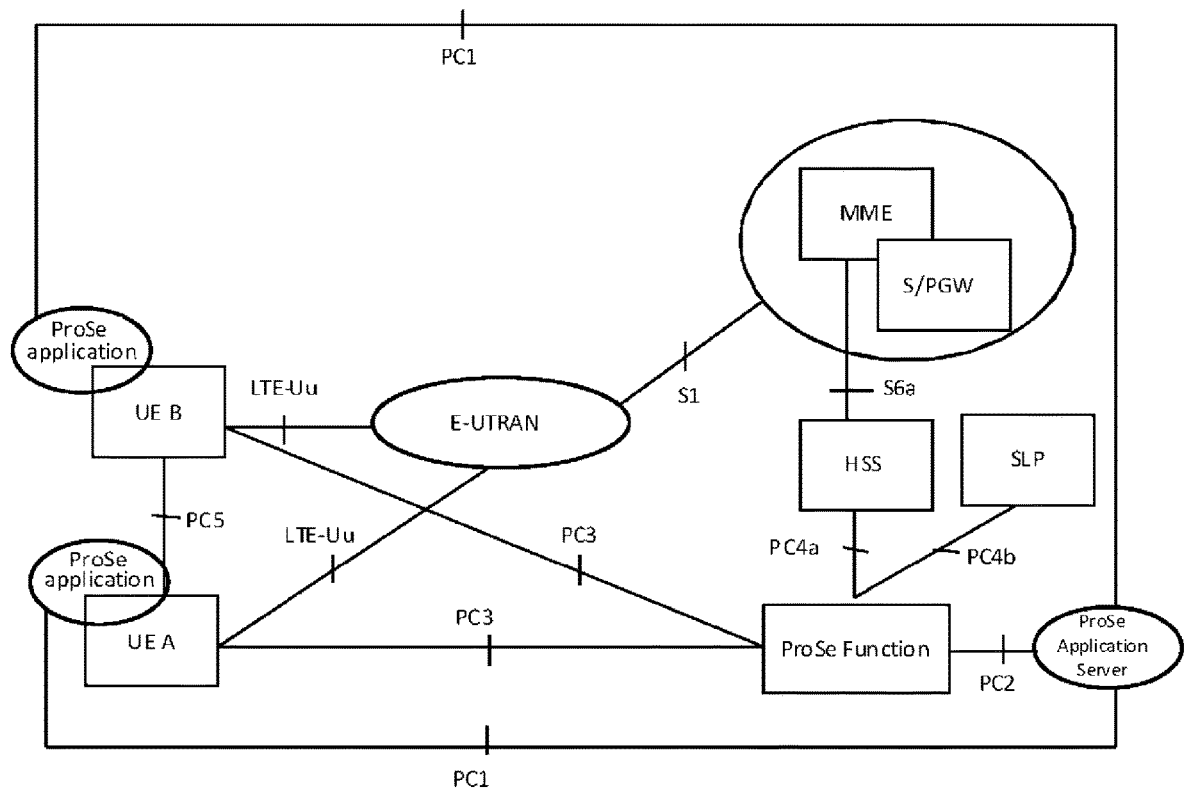

[Fig. 8]
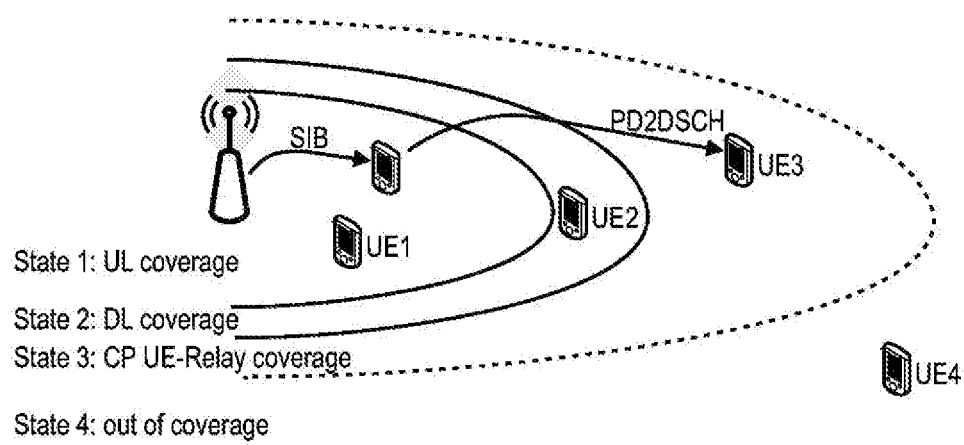

[Fig. 9]
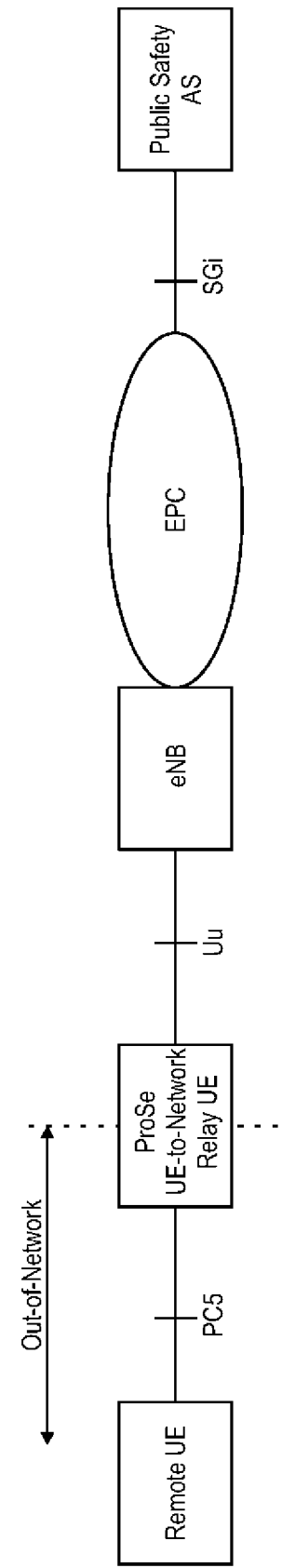

[Fig. 10]
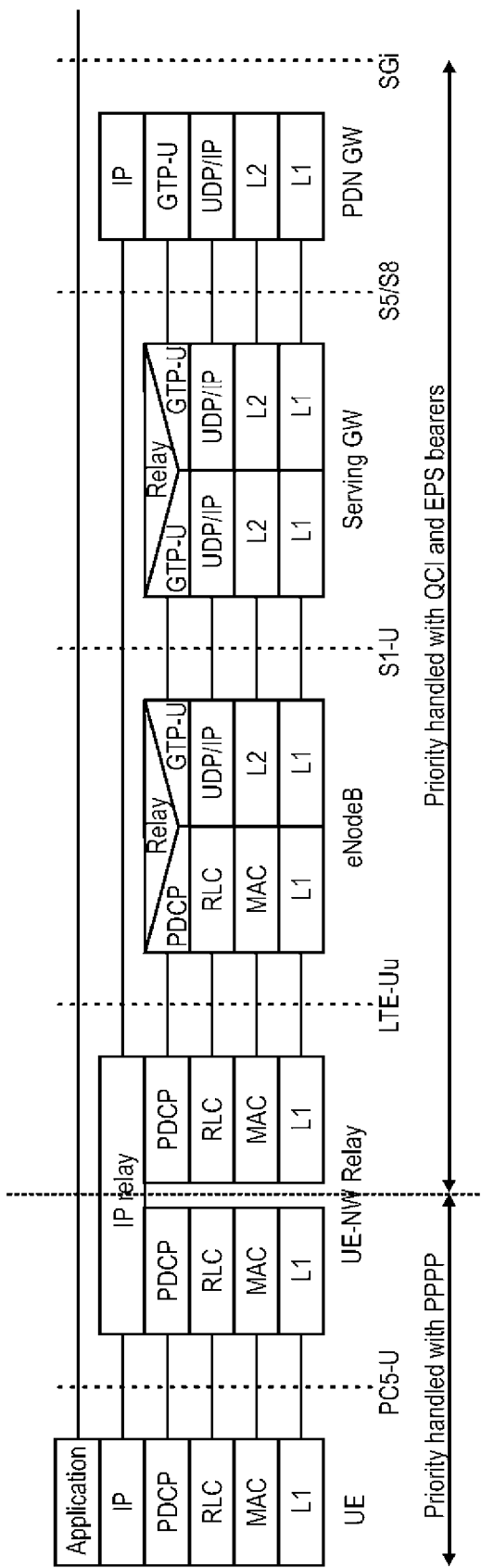

[Fig. 11]
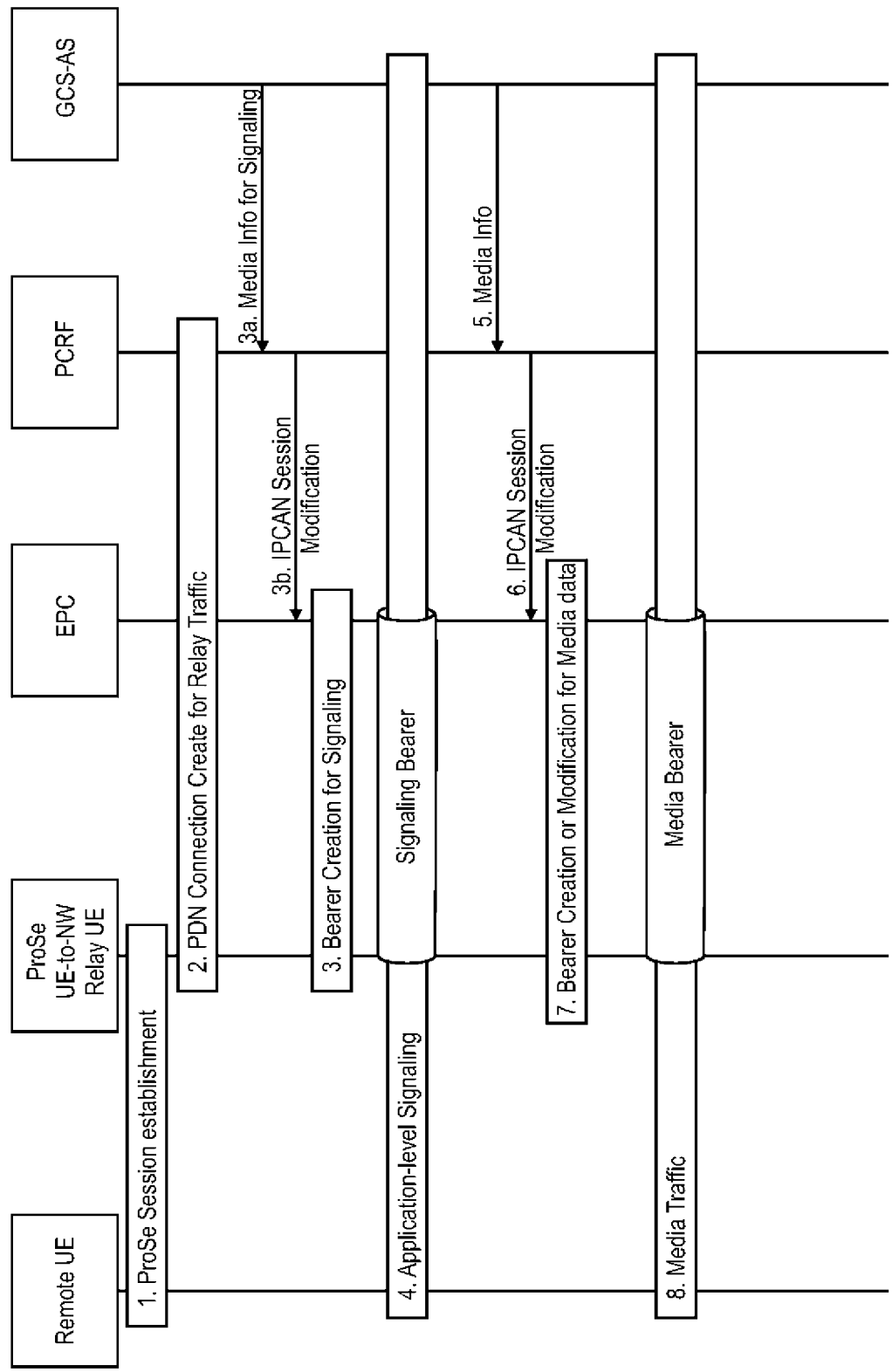

[Fig. 12]
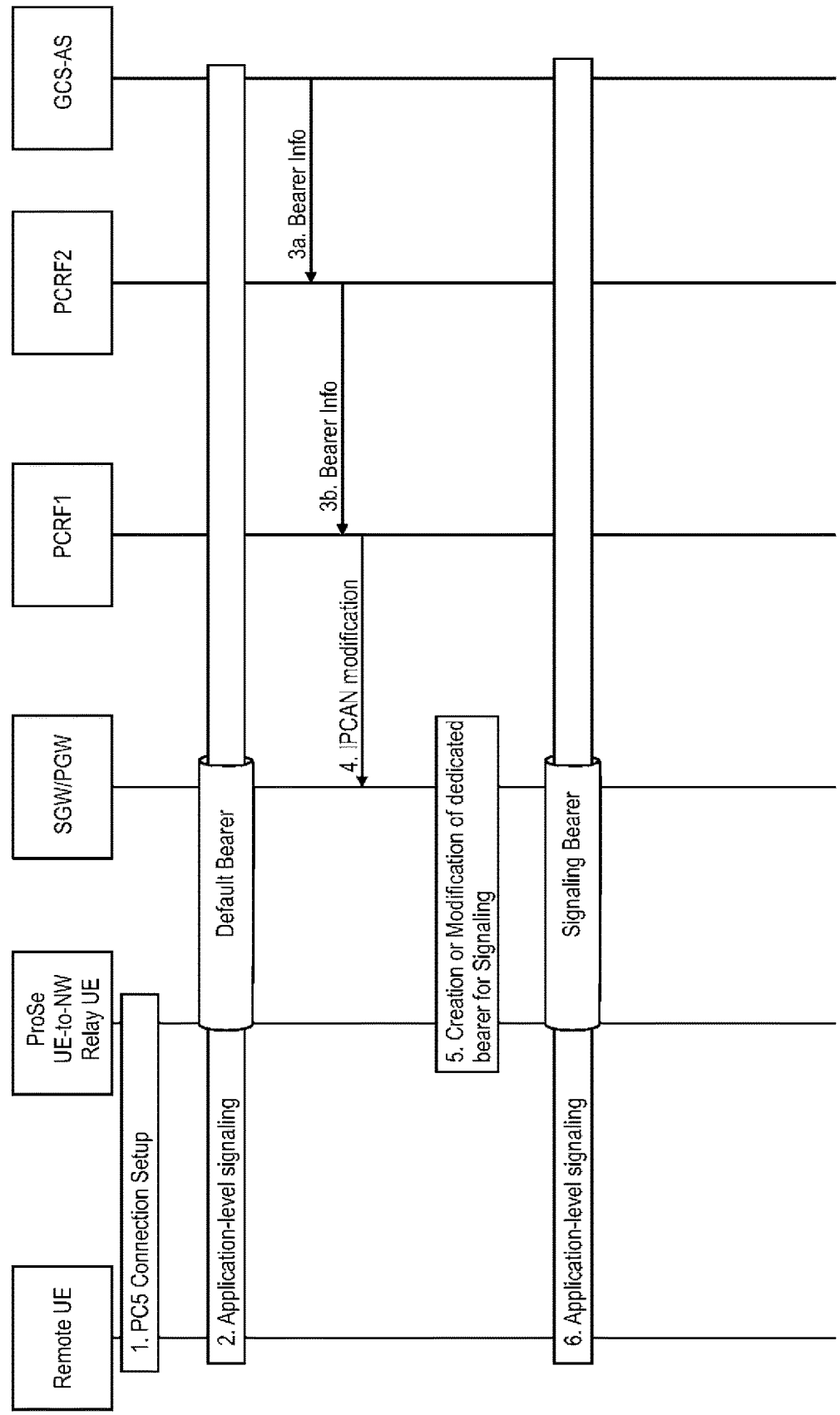

[Fig. 13]
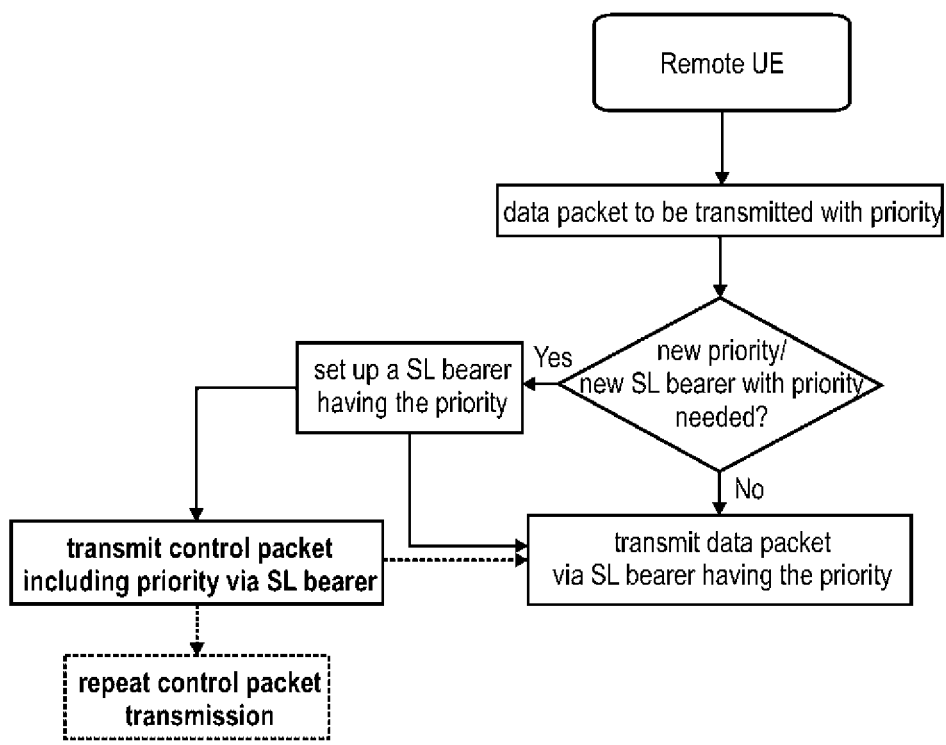

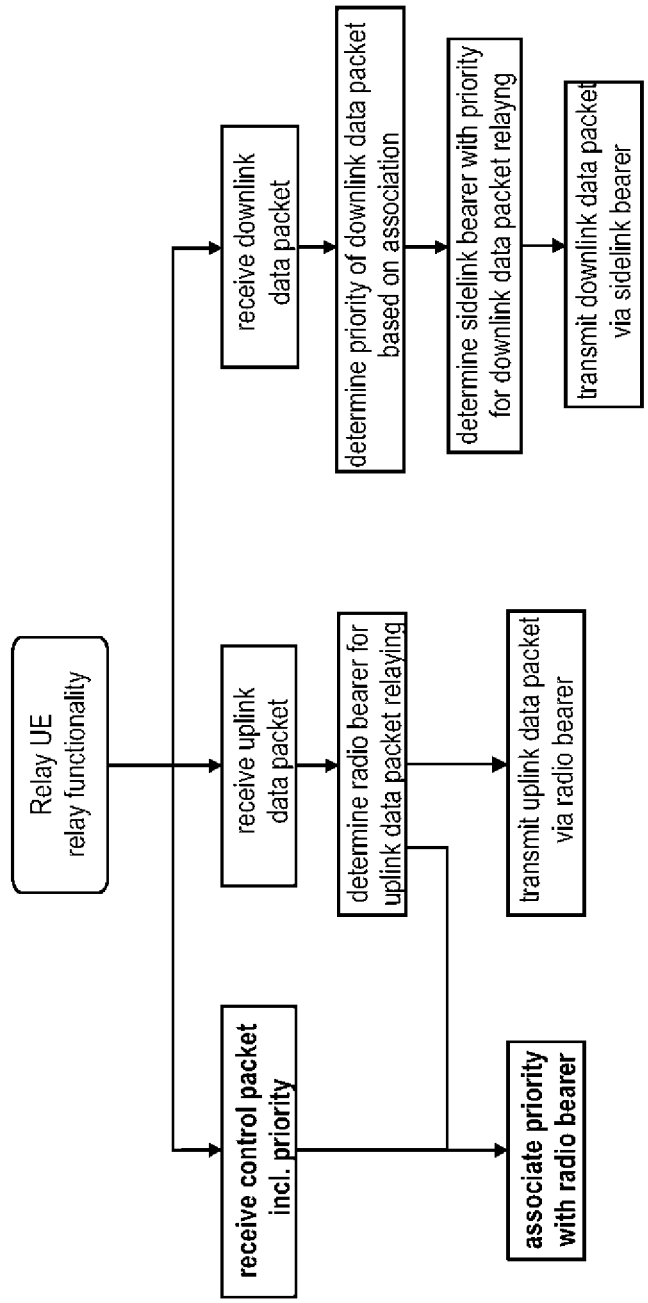
[Fig. 14]

[Fig. 15]
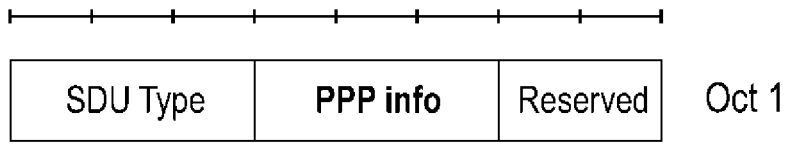
[Fig. 16]
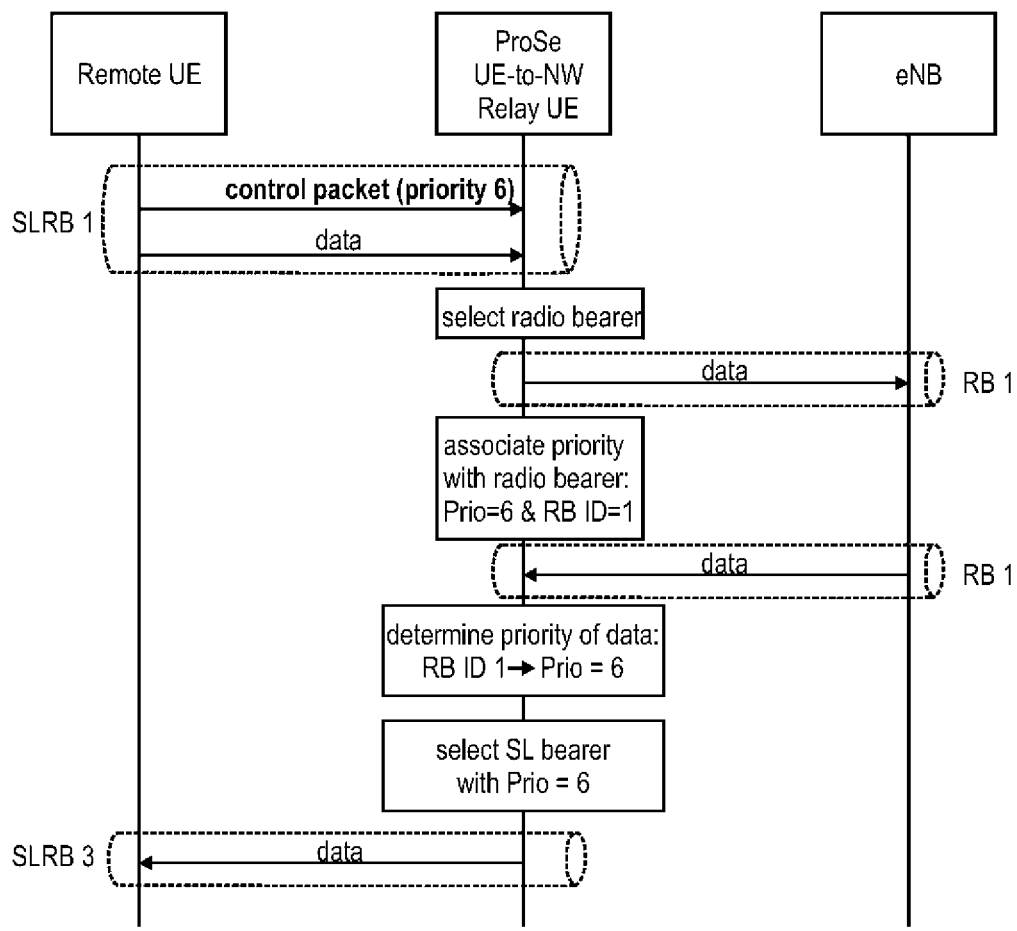

[Fig. 17]
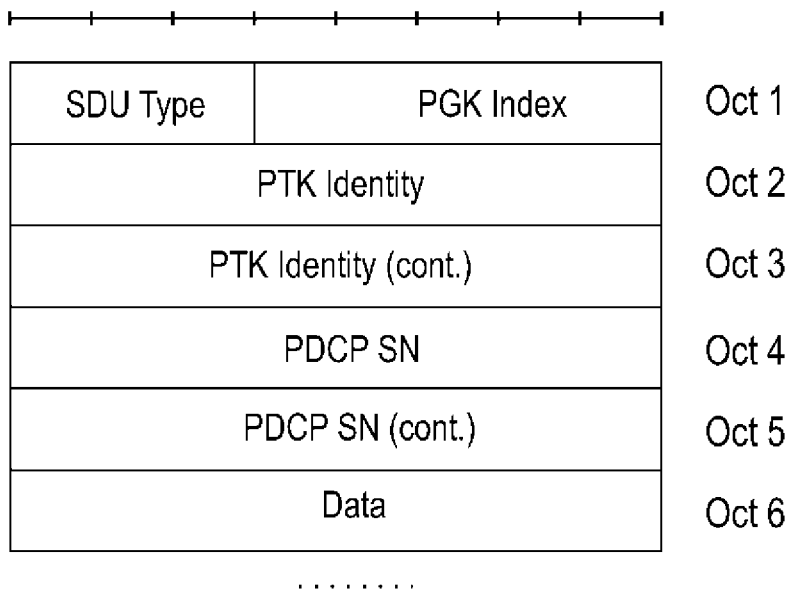
[Fig. 18]
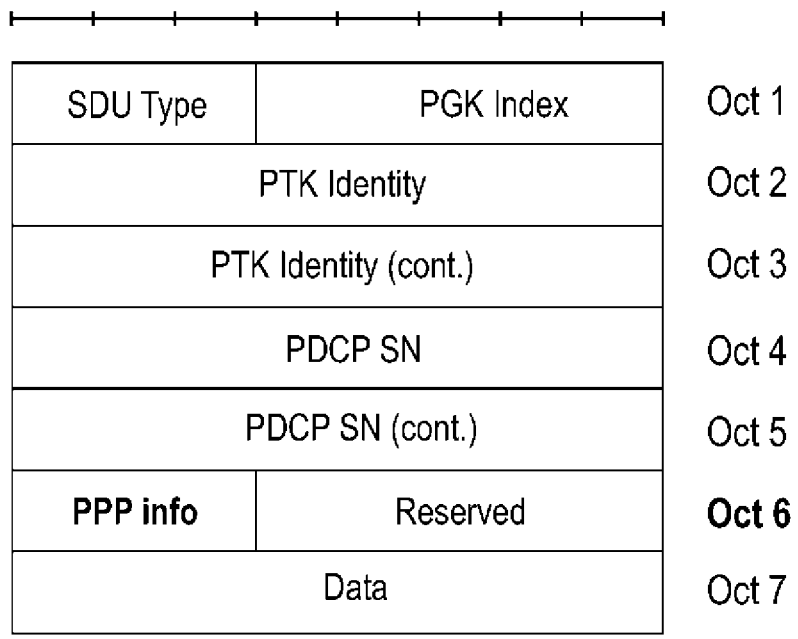

[Fig. 19]
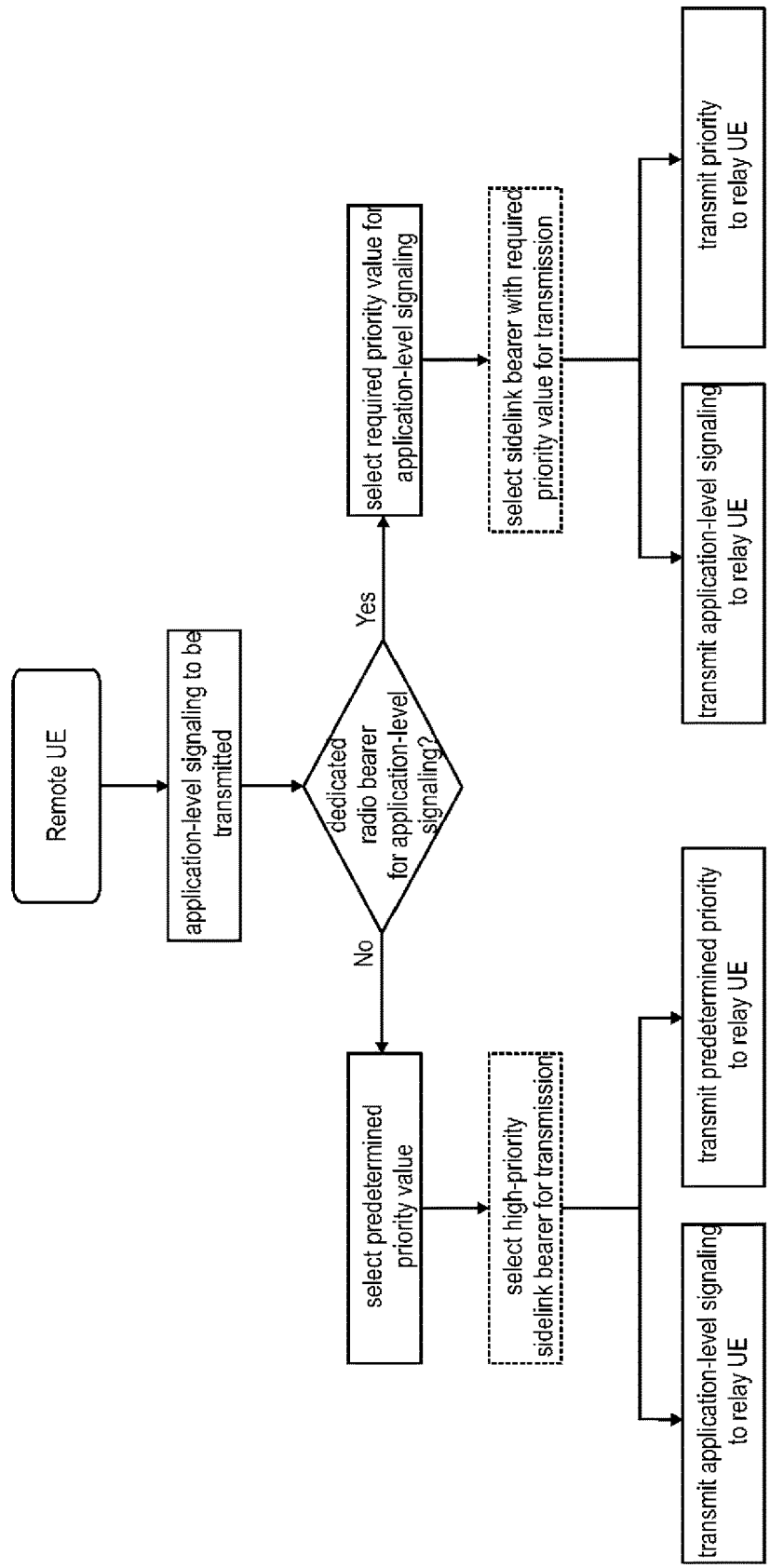

[Fig. 20]
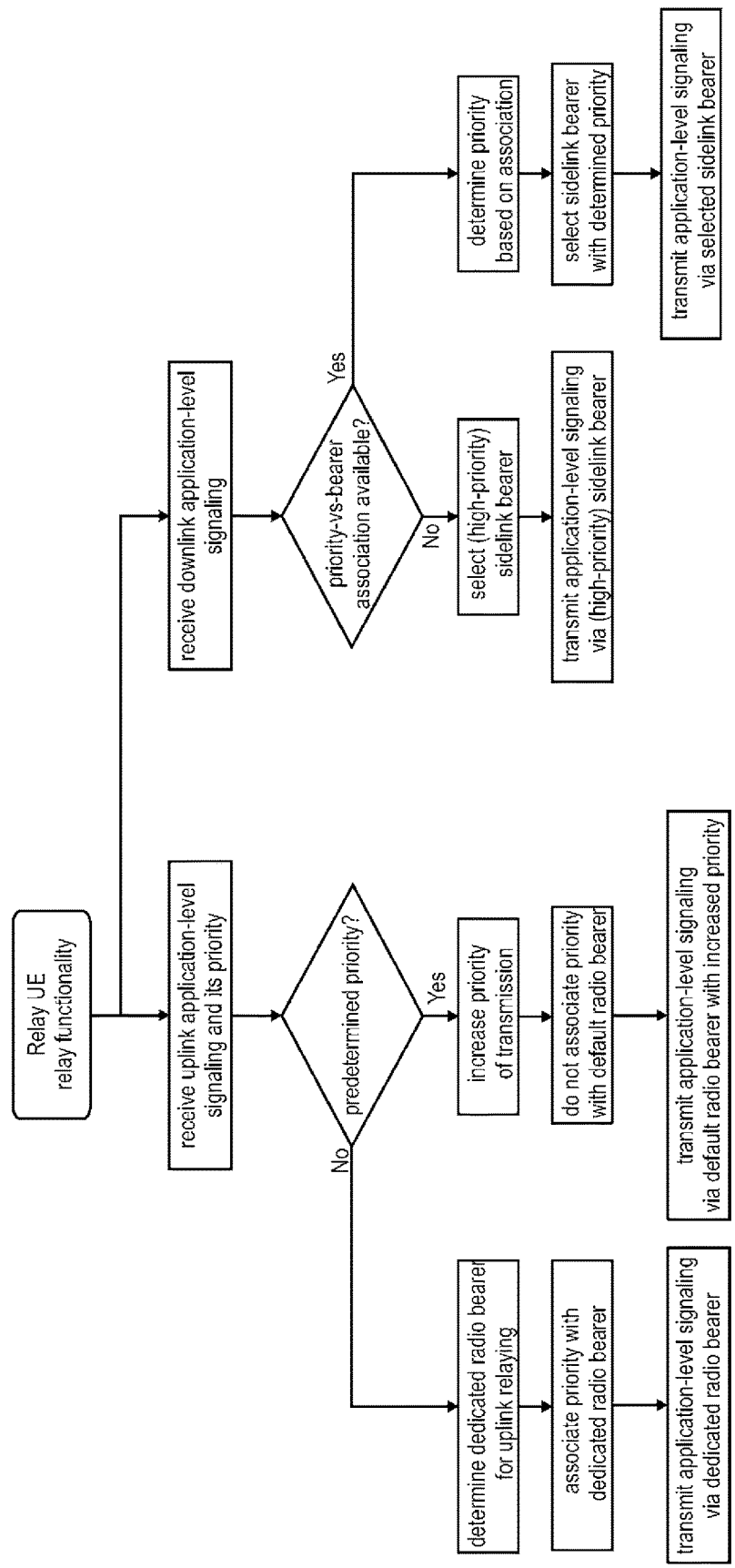

[Fig. 21]
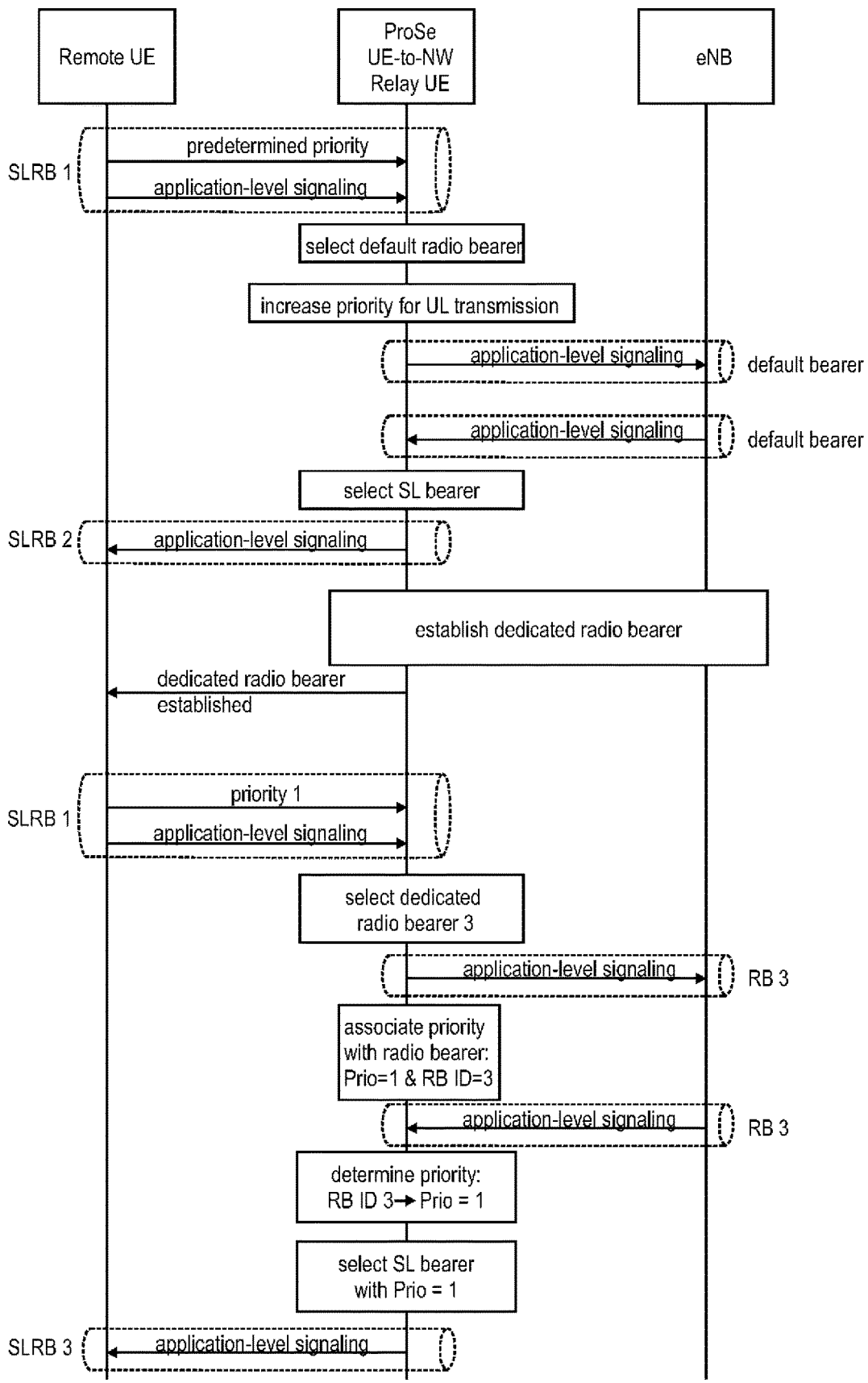

BEARER MAPPING FOR PROSE RELAY

TECHNICAL FIELD

The present disclosure relates to methods for relaying protocol data units between a relay user equipment and a remote user equipment. The present disclosure is also providing the relay user equipments and the remote user equipments for participating in the methods described herein.

BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g. parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} \times N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $$N_{RB}^{min,DL} \leq N_{RB}^{DL} \leq N_{RB}^{max,DL},$$

where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 2 (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.9 (NPL 1), section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g. barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell)

configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:

1. For each SCell the usage of uplink resources by the UE in addition to the downlink ones is configurable (the number of DL SCCs configured is therefore always larger or equal to the number of UL SCCs, and no SCell can be configured for usage of uplink resources only)

2. The downlink PCell cannot be de-activated, unlike SCells

3. Re-establishment is triggered when the downlink PCell experiences Rayleigh fading (RLF), not when downlink SCells experience RLF 4. Non-access stratum information is taken from the downlink PCell 5. PCell can only be changed with handover procedure (i.e. with security key change and RACH procedure)

6. PCell is used for transmission of PUCCH

7. The uplink PCell is used for transmission of Layer 1 uplink control information 8. From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or re-configure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 2—MAC Layer/Entity, RRC Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g. the 3GPP technical standard TS 36.321, current version 12.6.0 (NPL 2). The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g. RRC signaling) or traffic logical channels which carry user plane data. The following control logical channels are defined: broadcast control channel (BCCH), paging control channel (PCCH), common control channel (CCCH), multicast control channel (MCCH), and dedicated control channel (DCCH). The traffic logical channels are the dedicated traffic channel (DTCH) and the multicast traffic channel (MTCH).

The logical channels are associated with one out of four different Logical Channel Groups (LCGs) with the LCG IDs 0-3, e.g. for the purpose of buffer status reporting.

On the other hand, the data from the MAC layer is exchanged with the physical layer through transport channels, which are classified as downlink or uplink Data is multiplexed into transport channels depending on how it is transmitted over the air. The following downlink transport channels are defined: Broadcast channel (BCH), downlink shared channel (DL-SCH), paging channel (PCH), and multicast channel (MCH). The following uplink transport channels are defined: uplink shared channel (UL-SCH) and random access channel (RACH). Further information regarding the logical channels and the transport channels and their mapping in between can be found in the 3GPP technical standard 36.321, current version 12.6.0 in clause 4.5 "Channel Structure", incorporated in its entirety herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signalling Radio Bearer (SRBs) and of radio bearers carrying user data (Data Radio Bearers, DRBs).

Dedicated RRC messages are transferred across Signalling Radio Bearers, which are mapped via the PDCP and RLC layers onto logical channels—either the Common Control Channel (CCCH) during connection establishment or a Dedicated Control Channel (DCCH) in RRC_CONNECTED. System information and paging messages are mapped directly to logical channels, the Broadcast Control Channel (BCCH) and Paging Control Channel (PCCH) respectively.

In a mobile network using the Long Term Evolution (LTE) architecture, bearers are the "tunnels" used to connect the user equipment to Packet Data Networks (PDNs) such as the Internet. In LTE Network, QoS is implemented between UE and PDN Gateway and is applied to a set of bearers. 'Bearer' is basically a virtual concept and a set of network configuration to provide special treatment to a set of traffic, e.g. VoIP packets are prioritized by the network compared to web-browser traffic. Essentially, each stream of different characteristics (e.g. delay, delivery time, throughput, SNR, error-rate jitter etc.) is mapped to different bearers. Thus, a bearer is a unit of QoS control, and one bearer is used to fulfill one set of QoS requirements. In LTE, QoS is applied on the radio bearer, the S1 bearer and the S5/S8 bearer, collectively called an EPS bearer as shown in FIG. 3. FIG. 3 also illustrates the sidelink radio bearer between a relay UE and the remote UE served by the relay UE (see later sections for information on ProSe sidelink).

In an LTE mobile network, one default bearer is established to a default P-GW whenever the user equipment device is activated (this means the user equipment is on and has performed authentication). There must be at least one default bearer to one default P-GW, but up to 11 other bearers to the same or other P-GWs can be active to a single user equipment device. Bearers encapsulate user data with the GPRS tunneling protocol, user plane (GTP-U). The GTP-U information is in turn sent with UDP and inside IP packets. Every user equipment device has an "always on" default bearer for each P-GW to which it connects. For example, if user equipment connects to the Internet through one P-GW and a corporate intranet through another P-GW, two default bearers will be active. In addition, the user equipment can establish other dedicated bearers to other PDNs, based on quality-of-service (QoS) requirements. For instance, viewing a streaming video over the Internet could be done over a dedicated bearer. Dedicated bearers can use a bandwidth guarantee (a guaranteed bit rate, or GBR) or the user equipment can establish a non-GBR bearer.

There are two types of radio bearers in LTE: signaling radio bearers (SRB) which carrier control signaling, e.g. RRC signaling/NAS information (there are types of SRB in LTE: SRB0, SRB1 and SRB2), and data radio bearer (DRBs) which carry user plane traffic/data. A UE supports up to 8 DRBs.

The EPS bearer itself is a concatenated tunnel consisting of three portions (in a non-roaming situation), established in the following order:

The S5 bearer—This tunnel connects the Serving Gateway (S-GW) to the P-GW. (The tunnel can extend from P-GW to PDN service network, but this is not considered here.)

The S1 bearer—This tunnel connects the evolved NodeB (eNodeB or eNB) radio cell with the S-GW. Handover establishes a new S1 bearer for end-to-end connectivity.

The radio bearer—This tunnel connects the user equipment to the eNodeB (eNB). This bearer follows the mobile user under the direction of the Mobile Management Entity (MME) as the radio network performs handovers when the user moves from one cell to another.

For all different types of bearers listed above, there is a one-to-one mapping relationship. In other words, there is a unique match between an EPS bearer and an E-RAB, between an E-RAB and a radio bearer, and between a radio bearer and an S1 bearer.

Each bearer uses a set of QoS parameters to describe the properties of the transporting channel, such as bit rates, packet delay, packet loss, bit error rate and scheduling policy. The four key parameters are outlined here.

QoS class indicator (QCI): The QCI basically defines a unique expected treatment of a bearer and is intended to provide similar handling of bearers of the same QCI even if network nodes are developed by different vendors. Based on the received QCI value, each network node knows how to treat the corresponding associated bearer, i.e. a QCI value is associated to a bearer. The list of current defined QCI values can be found in 3GPP TS23.203, current version 13.4.0 (NPL 3), section 6.1.7.

Allocation and Retention Priority (ARP):

ARP specifies the forwarding treatment for the control-plane traffic that the bearers receive. ARP enables bearer establishment and modification, as well as connection setup and release. For example, ARP can be used by the EPS to decide which bearer should be released during resource limitations or traffic congestion.

Maximum Bit Rate (MBR):

MBR is applicable only for real-time services and is defined for GBR bearers. MBR is the bit rate that the traffic on the bearer may not exceed.

Guaranteed Bit Rate (GBR):

GBR specifies the bit rate that the network guarantees (e.g. through the use of an admission control function) for that bearer. In 3GPP Release 8 and beyond, the MBR must be set equal to the GBR; that is, the guaranteed rate is also the maximum rate that is allowed by the system.

Logical Channel Prioritization, LCP, Procedure

For the uplink, the process by which a UE creates a MAC PDU to be transmitted using the allocated radio resources is fully standardized; the LCP procedure is designed to ensure that the UE satisfies the QoS of each configured radio bearer in a way which is optimal and consistent between different UE implementations. Based on the uplink transmission resource grant message signalled on the PDCCH, the UE has to decide on the amount of data for each logical channel to be included in the new MAC PDU and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel is served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels take up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU.

The Logical Channel Prioritization is standardized e.g. in 3GPP TS 36.321, current version v12.6.0, in subclause 5.4.3.1 incorporated herein by reference.

The Logical Channel Prioritization (LCP) procedure is applied when a new transmission is performed.

RRC controls the scheduling of uplink data by signalling for each logical channel:
  priority where an increasing priority value indicates a lower priority level,
  prioritisedBitRate which sets the Prioritized Bit Rate (PBR),
  bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size, and if the value of Bj is larger than the bucket size of logical channel j, it shall be set to the bucket size. The bucket size of a logical channel is equal to PBR×BSD, where PBR and BSD are configured by upper layers.

The UE (MAC entity) shall perform the following Logical Channel Prioritization procedure when a new transmission is performed:
  The UE (MAC entity) shall allocate resources to the logical channels in the following steps:
    Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
    Step 2: the UE (MAC entity) shall decrement Bj by the total size of MAC SDUs served to logical channel j in Step 1 NOTE: The value of Bj can be negative.
    Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
  The UE (MAC entity) shall also follow the rules below during the scheduling procedures above:
    The UE (MAC entity) should not segment an RLC SDU (or partially transmitted SDU or retransmitted RLC PDU) if the whole SDU (or partially transmitted SDU or retransmitted RLC PDU) fits into the remaining resources;
    if the UE (MAC entity) segments an RLC SDU from the logical channel, it shall maximize the size of the segment to fill the grant as much as possible;
    the UE (MAC entity) should maximise the transmission of data.
    if the UE (MAC entity) is given an UL grant size that is equal to or larger than 4 bytes while having data available for transmission, the UE (MAC entity) shall not transmit only padding BSR and/or padding (unless the UL grant size is less than 7 bytes and an AMD PDU segment needs to be transmitted).

The UE shall not transmit data for a logical channel corresponding to a radio bearer that is suspended (the conditions for when a radio bearer is considered suspended are defined in TS 36.331).

For the Logical Channel Prioritization procedure, the UE shall take into account the following relative priority in decreasing order:
  MAC control element for C-RNTI or data from UL-CCCH;
  MAC control element for BSR, with exception of BSR included for padding;
  MAC control element for PHR or Extended PHR, or Dual Connectivity PHR;
  data from any Logical Channel, except data from UL-CCCH;
  MAC control element for BSR included for padding.

When the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when the UE is requested to transmit multiple MAC PDUs in one TTI.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the present disclosure the terms "D2D", "ProSe" and "sidelink" are interchangeable.

D2D Communication in LTE

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface and will be described in more detail later.

In D2D communication, UEs transmit data signals to each other over a direct link using the cellular resources instead of through the base station (BS). D2D users communicate directly while remaining controlled under the BS, i.e. at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e. no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the user plane protocols, part of the agreement from D2D communication perspective is given in the following (see also 3GPP TR 36.843 current version 12.0.1 (NPL 4) section 9.2.2, incorporated herein by reference):

PDCP:
  1:M D2D broadcast communication data (i.e. IP packets) should be handled as the normal user-plane data.
  Header-compression/decompression in PDCP is applicable for 1:M D2D broadcast communication.
    U-Mode is used for header compression in PDCP for D2D broadcast operation for public safety;
RLC:
  RLC UM is used for 1:M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.
  So far no need has been identified for RLC AM or RLC TM for D2D communication for user plane data transmission.
MAC:
  No HARQ feedback is assumed for 1:M D2D broadcast communication
  The receiving UE needs to know a source ID in order to identify the receiver RLC UM entity.
  The MAC header comprises a L2 target ID which allows filtering out packets at MAC layer.
  The L2 target ID may be a broadcast, group cast or unicast address.
    L2 Groupcast/Unicast: A L2 target ID carried in the MAC header would allow discarding a received RLC UM PDU even before delivering it to the RLC receiver entity.
    L2 Broadcast: A receiving UE would process all received RLC PDUs from all transmitters and aim to re-assemble and deliver IP packets to upper layers.
  MAC sub header contains LCIDs (to differentiate multiple logical channels).
  At least Multiplexing/de-multiplexing, priority handling and padding are useful for D2D.
ProSe Direct Communication Layer-2 Link In brief, ProSe direct one-to-one communication is realised by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g. self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v1.4.0 section 7.1.2 incorporated herein by reference:
  Establishment of a secure layer-2 link over PC5.
  IP address/prefix assignment.
  Layer-2 link maintenance over PC5.
  Layer-2 link release over PC5.
  FIG. 4 discloses how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

At least the following standard IETF mechanisms can be used for IP address/prefix assignment:
  DHCP-based IP address configuration for assignment of an IPv4 address.
  IPv6Stateless Address auto configuration specified in RFC 4862 for assignment of an IPv6 prefix.

One of the two UEs acts as a DHCP server or an IPv6 default router. In the ProSe UE-NW Relay case (also see later chapter on ProSe relay), the relay acts as DHCP server or IPv6 default router for all Remote UEs that connect to it over a secure layer-2 link over PC5.

UEs engaging in isolated (non-relay) one-to-one communication may also use link-local addresses.

The PC5 Signalling Protocol shall support keep-alive functionality that is used to detect when the UEs are not in ProSe Communication range, so that they can proceed with implicit layer-2 link release.

The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.3.0 (NPL 5), defines in subclause 8.3 the following identities to use for ProSe Direct Communication:
  SL-RNTI: Unique identification used for ProSe Direct Communication Scheduling;
  Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signalling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g. Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e. SA). One resource pool is defined e.g. by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e. RRC_IDLE or RRC_CONNECTED, and the coverage state of the UE, i.e. in-coverage, out-of-coverage. A UE is considered in-coverage if it has a serving cell (i.e. the UE is RRC_CONNECTED or is camping on a cell in RRC_IDLE).

FIG. 5 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 5 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 5 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e. resource pool) are provided; this may be done e.g. with the exchange of the D2D communication Interest Indication by the UE and the corresponding response, D2D Communication Response, where the corresponding exemplary ProseCommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send BSR) via PDCCH, scrambled by C-RNTI;

Step 3: UE sends D2D BSR indicating the buffer status via PUSCH;

Step 4: eNB grants D2D resource (for UE to send data) via PDCCH, scrambled by D2D-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g. pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e. SCI content) are defined in the 3GPP technical standard 36.212, current version 12.4.0 (NPL 6), subclause 5.4.3, incorporated herein by reference, defining in particular the SCI format 0.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 6 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

ProSe Network Architecture and ProSe Entities

FIG. 7 illustrates a high-level exemplary architecture for a non-roaming case, including different ProSe applications in the respective UEs A and B, as well as a ProSe Application Server and ProSe function in the network. The example architecture of FIG. 7 is taken from TS 23.303 v.13.0.0 (NPL 7) chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

UE Coverage States for D2D

As already mentioned before, the resource allocation method for D2D communication depends apart from the RRC state, i.e. RRC_IDLE and RRC_CONNECTED, also on the coverage state of the UE, i.e. in-coverage, out-of-coverage. A UE is considered in-coverage if it has a serving cell (i.e. the UE is RRC_CONNECTED or is camping on a cell in RRC_IDLE).

The two coverage states mentioned so far, i.e. in-coverage (IC) and out-of-coverage (OOC), are further distinguished into sub-states for D2D. FIG. 8 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e. only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is, strictly speaking, already considered as out-of-coverage (OOC). However, UE3 is in the coverage of some UEs which are themselves (e.g. UE1) in the coverage of the cell, i.e. those UEs can be also referred as CP-relay UEs or simply relay UEs (see also later chapters on ProSe relay). Therefore, the area of the state-3 UEs in FIG. 8 can be denoted as CP UE-relay coverage area. UEs in this state 3 are also referred to as OOC-state-3 UEs. In this state the UEs may receive some cell-specific information which is sent by the eNB (SIB) and forwarded by the CP UE-relay UEs in the coverage of the cell via PD2DSCH to the OOC-state-3 UEs. A (contention-based) network-controlled resource pool is signalled by PD2DSCH.

State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of coverage devices and legacy E-UTRA transmissions. In general, D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimise interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned.

D2D Discovery—Models and Resource Allocation

ProSe Direct Discovery is defined as the procedure used by the ProSe-enabled UE to discover other ProSe-enabled UE(s) in its proximity using E-UTRA direct radio signals via PC5. Upper layer handles authorization for announcement and monitoring of discovery information. For this purpose, UEs have to exchange predefined signals, referred to as "discovery signals". By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g. "find a taxi nearby", "find me a coffee shop". Additionally depending on the information obtained, ProSe Direct Discovery can be used for subsequent actions e.g. to initiate ProSe Direct Communication.

The following models for ProSe Direct Discovery are defined in the standard 3GPP TS 23.303, current version 13.0.0, section 5.3 and all subsections thereof, incorporated herein by reference.

Model A ("I am here"):

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at predefined discovery intervals and the monitoring UEs that are interested in these messages read them and process them. This model may be referred to as "I am here" since the announcing UE would broadcast information about itself e.g. its ProSe Application Code in the discovery message.

Model B ("who is there?"/"are you there?"):

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It can be referred to as "who is there/are you there" since the discoverer UE sends information for other UEs that would like to receive responses, e.g. the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:
  The eNB provides the UE(s) with the resource pool configuration used for announcing of discovery information. The configuration may be e.g. signalled in SIB.
  The UE autonomously selects radio resource(s) from the indicated resource pool and announces discovery information.
  The UE can announce discovery information on a randomly selected discovery resource during each discovery period.

Scheduled resource allocation (called Type 2 subsequently): A resource allocation procedure where resources for announcing discovery information are allocated on a per-UE-specific basis, further characterized by:
  The UE in RRC_CONNECTED may request resource (s) for announcing of discovery information from the eNB via RRC. The eNB assigns resource(s) via RRC.
  The resources are allocated within the resource pool that is configured in UEs for monitoring.

For UEs in RRC_IDLE the eNB may select one of the following options:
  The eNB may provide a Type 1 resource pool for discovery information announcement in SIB. UEs that are authorized for Prose Direct Discovery use these resources for announcing discovery information in RRC_IDLE.
  The eNB may indicate in SIB that it supports D2D but does not provide resources for discovery information announcement. UEs need to enter RRC Connected in order to request D2D resources for discovery information announcement.

For UEs in RRC_CONNECTED:
  A UE authorized to perform ProSe Direct Discovery announcement indicates to the eNB that it wants to perform D2D discovery announcement
  The eNB validates whether the UE is authorized for ProSe Direct Discovery announcement using the UE context received from MME.
  The eNB may configure the UE to use a Type 1 resource pool or dedicated Type 2 resources for discovery information announcement via dedicated RRC signalling (or no resource).
  The resources allocated by the eNB are valid until a) the eNB de-configures the resource (s) by RRC signaling or b) the UE enters IDLE.

Receiving UEs in RRC_IDLE and RRC_CONNECTED monitor both Type 1 and Type 2 discovery resource pools as authorised. The eNB provides the resource pool configuration used for discovery information monitoring in SIB. The SIB may contain discovery resources used for announcing in neighbour cells as well.

LCP Procedure for D2D, Sidelink Logical Channels

The LCP procedure for D2D will be different than the above-presented LCP procedure for "normal" LTE data. The following information is taken from TS 36.321, current version 12.6.0, subclause 5.14.1.3.1 describing LCP for ProSe; it is incorporated herewith in its entirety by reference.

All D2D (sidelink) logical channels, e.g. STCH, Sidelink Traffic CHannel, are allocated to the same logical channel group (LCG) with LCGID set to '11' (see subclause 5.14.1.4

"Buffer Status Reporting" of TS 36.321 version 12.6.0). In Rel-12 there is no prioritization mechanism for D2D (sidelink) logical channels/groups. Essentially, all sidelink logical channels have the same priority from UE point of view, i.e. the order by which the sidelink logical channels are served is left for UE implementation.

ProSe UE-to-Network Relay

A UE may also support the functionality and procedure(s) so as to act as a ProSe UE-to-Network Relay, such that a Remote UE communicates with the ProSe UE-to-Network Relay over the PC5 reference point. ProSe UE-to-Network Relay operation will be specified within 3GPP Release 13. So far, only initial agreements have been made in the 3GPP RAN working groups, some of which can be seen e.g. from 3GPP TS 23.303 current version 13.0.0 and TR 23.713 current version 1.4.0 (NPL 8), incorporated herein by reference. Some of those agreements will be listed below. It should however be noted that this work item has been introduced very recently and thus is still in the process of standardization. Consequently, any agreements assumed in the following can still be changed or reversed, and the following agreements, which are assumed for discussion purposes, shall however not be understood as limiting the present disclosure to this particular 3GPP implementation at this very early stage of standardization.

- For the ProSe UE-to-Network Relay discovery and ProSe relay (re)selection both scenarios where Remote UEs are in-coverage and out-of-coverage can be addressed.
- Relay UE will always be in-coverage. The eNB at the radio level can control whether the UE can act as a relay, whereas whether the network control is per relay UE, per cell (broadcast configuration), or both, or something else is still undecided.
- When Remote UE is in-coverage for relay discovery purposes, the monitoring and transmitting resources for discovery can be provided e.g. by the eNB using the Rel-12 mechanisms (broadcast for idle mode and dedicated signalling for connected mode). The remote UE can decide when to start monitoring.
- When the Remote UE is out of coverage, the monitoring and transmitting resources for discovery and communication (actual data transfer) can be provided e.g. by pre-configuration i.e. by way of specification/operator configuration (in USIM etc.) such that the UE exactly knows which resources to use.

ProSe UE-to-Network Relay (re)selection:

The Remote UE can take radio level measurements of the PC5 radio link quality into account for the ProSe UE-to-Network Relay selection procedure.

For the case that the Remote UE is out-of-coverage, the radio level measurements can be used by the remote UE together with other higher layer criteria to perform relay selection.

For the case that Remote UE is out-of-coverage, the criteria for reselection is based on PC5 measurements (RSRP or other RAN1 agreed measurements) and higher layer criteria. The relay reselection can be triggered by the remote UE.

For the case that the Remote UE is in-coverage, it is not yet decided whether and how these measurements (PC5 measurements) are used (e.g. the measurements can be used by the UE to perform selection similar to out-of-coverage case, or they can be reported to the eNB).

The ProSe UE-to-Network relay may use layer-3 packet forwarding. Control information between ProSe UEs can be exchanged over the PC5 reference point, e.g. for UE-to-Network Relay detection and ProSe Direct Discovery.

A ProSe-enabled UE will also support the exchange of ProSe control information between another ProSe-enabled UE and the ProSe Function over the PC3 reference point. In the ProSe UE-to-Network Relay case, the Remote UE will send this control information over the PC5 user plane to be relayed over the LTE-Uu interface towards the ProSe Function.

The ProSe UE-to-Network Relay entity provides the functionality to support connectivity to "unicast" services for Remote UEs that are not in the coverage area of an eNB, i.e. not connected to E-UTRAN. FIG. 9 shows a ProSe UE-to-Network Relay scenario. The ProSe UE-to-Network Relay shall relay unicast traffic (UL and/or DL) between the Remote UE and the network. The ProSe UE-to-Network Relay shall provide a generic function that can relay any type of traffic that is relevant for public safety communication.

One-to-One Direct Communication Between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

ProSe UE-to-Network Relaying may include the following functions:

- ProSe Direct discovery following Model A or Model B can be used in order to allow the Remote UE to discover ProSe UE-to-Network Relay(s) in proximity.
- ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.
- Act as an "announcing" or "discoveree" UE on the PC5 reference point supporting direct discovery.
- Act as a default router to the Remote UEs forwarding IP packets between the UE-ProSe UE-to-Network Relay point-to-point link and the corresponding PDN connection.
- Handle Router Solicitation and Router Advertisement messages as defined in IETF RFC 4861.
- Act as DHCPv4 Server and stateless DHCPv6 Relay Agent.
- Act as a NAT if IPv4 is used replacing the locally assigned IPv4 address of the Remote UE with its own.
- Map the L2 link ID used by the Remote UE as Destination Layer-2 ID to the corresponding PDN connection supported by the ProSe UE-to-Network Relay.

The user plane protocol architecture for the ProSe UE-to-Network relay is shown in FIG. 10.

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v1.4.0 incorporated herein by reference.

ProSe UE-to-Network Relay Discovery

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v1.4.0 incorporated herein by reference.

The following parameters are common to all of UE-to-Network Relay Discovery, Group Member Discovery and UE-to-UE Relay Discovery:

- Message type: Announcement (Model A) or Solicitation/Response (Model B), Relay Discovery Additional Information (Model A).
- Discovery type: indicates whether this is UE-to-Network Relay Discovery, Group Member Discovery or UE-to-UE Relay Discovery.

The following parameters are used in the UE-to-Network Relay Discovery Announcement message (Model A):

- ProSe Relay UE ID: link layer identifier that is used for direct communication and is associated with a PDN connection the ProSe UE-to-Network Relay has established.
- Announcer info: provides information about the announcing user.
- Relay Service Code: parameter identifying a connectivity service the ProSe UE-to-Network Relay provides to Public Safety applications. The Relay Service Codes are configured in a ProSe UE-to-Network relay for advertisement and map in the ProSe UE-to-Network relay to specific APNs they offer connectivity to. Additionally, the Relay Service Code also identifies authorized users the ProSe UE-to-Network relay would offer service to, and may select the related security policies or information e.g. necessary for authentication and authorization between the Remote UE and the ProSe UE-to-Network Relay (e.g. a Relay Service Code for relays for police members only would be different than a Relay Service code for relays for Fire Fighters only, even though potentially they provided connectivity to same APN e.g. to support Internet Access).
- Radio Layer Information: contains information about the radio layer information, e.g. radio conditions between the eNB and the UE-to-Network Relay, to assist the Remote UE selecting the proper UE-to-Network Relay.

The following parameters are used in the UE-to-Network Relay Discovery Solicitation message (Model B):

- Discoverer info: provides information about the discoverer user.
- Relay Service Code: information about connectivity that the discoverer UE is interested in. The Relay Service Codes are configured in the Prose Remote UEs interested in related connectivity services.
- ProSe UE ID: link layer identifier of the discoverer that is used for direct communication (Model B).

The following parameters are used in the UE-to-Network Relay Discovery Response message (Model B):

- ProSe Relay UE ID: link layer identifier that is used for direct communication and is associated with a PDN connection the ProSe UE-to-Network Relay has established.
- Discoveree info: provides information about the discoveree.
- Radio Layer Information: contains information about the radio layer information, e.g. radio conditions between the eNB and the UE-to-Network Relay, to assist the Remote UE selecting the proper UE-to-Network Relay.

ProSe Direction Communication Via the ProSe UE-to-Network Relay

The UE-to-Network Relay function will be specified based upon an evolution of the ProSe functionality already documented in TS 23.303.

A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). PDN connection(s) supporting UE-to-Network Relay shall only be used for Remote ProSe UE(s) relay traffic.

ProSe UE-to-Network Relay provides a generic L3 forwarding function that can relay any type of IP traffic between the Remote UE and the network. One-to-one ProSe Direct Communication is used between the Remote UE and the ProSe UE-to-Network Relay. The Remote UE is authorised by upper layer and can be in-coverage or out-of-coverage of EUTRAN for UE-to-Network Relay discovery, selection and communication. The ProSe UE-to-Network Relay UE is always in-coverage of EUTRAN.

The eNB controls whether the UE can act as a ProSe UE-to-Network Relay.

- If the eNB broadcast any information associated to ProSe UE-to-Network Relay operation, then ProSe UE-to-Network Relay operation is supported in the cell.
- The eNB may indicate that the ProSe UE-to-Network Relay operation is supported and may provide transmission and reception resource pool(s) for ProSe UE-to-Network Relay discovery in broadcast signalling.
- The eNB may broadcast a minimum and/or a maximum Uu link quality (RSRP/RSRQ) threshold that the ProSe UE-to-Network Relay UE needs to respect to autonomously start/stop the UE-to-Network Relay discovery procedure using the broadcasted threshold(s). The eNB may configure none, one of the threshold or both thresholds.
- If the eNB broadcast that the ProSe UE-to-Network Relay operation is supported but does not broadcast transmission resource pool for ProSe-UE-to Network Relay discovery, then UE can initiate request for ProSe-UE-to-Network Relay discovery resources by dedicated signalling. The eNB may configure the UE to become a ProSe-UE-to-Network Relay by dedicated signalling.
- It should be noted that it is not yet clear if the eNB can optionally broadcast a minimum and/or a maximum Uu link quality (RSRP/RSRQ) threshold that the UEs need to respect before requesting transmitting relay discovery resources and if a differentiation of behavior between Model A and Model B is needed.
- If the ProSe-UE-to-Network Relay is initiated by broadcast signalling, it can perform ProSe UE-to-Network Relay discovery when in RRC_IDLE. If the ProSe UE-to-Network Relay is initiated by dedicated signalling, it can perform relay discovery as long as it is in RRC_CONNECTED.

It should be noted that it is not yet clear if the pool is only for relay operation or for other PS discovery services as well, and if pool can be used by only ProSe UE-to-Network Relay, or by both ProSe UE-to-Network Relay and Remote UE.

It should be noted that it is not yet clear if the eNB can control the UEs on an individual basis if it is broadcasting relay discovery resources, and if a UE in connected mode can use the broadcast relay discovery resources.

It should be noted that it is not yet clear what the potential minimization of service interruption is for the cases where the UE is moving from in-coverage to out-of-coverage and from out-of-coverage to in-coverage.

A UE-to-Network Relay performing one-to-one sidelink communication has to be in RRC_CONNECTED. After receiving a layer-2 link establishment request (upper layer message) from the Remote UE, the ProSe UE-to-Network Relay indicates to the eNB that it intends to perform ProSe UE-to-Network Relay one-to-one communication. The eNB may provide resources for ProSe UE-to-Network Relay one-to-one communication.

The Remote UE performs radio measurements at the PC5 interface and uses same for ProSe UE-to-Network Relay selection and reselection along with higher layer criterion. A ProSe UE-to-Network Relay is considered suitable in terms of radio criteria if the PC5 link quality exceeds a configured threshold (pre-configured or provided by eNB). The Remote UE may also trigger ProSe UE-to-Network Relay reselection when it receives a layer-2 link release message (upper layer message) from ProSe UE-to-Network Relay. In RRC_CONNECTED state, after selecting a ProSe UE-to-Network Relay, the Remote UE informs the eNB that it intends to use ProSe UE-to-Network Relay one-to-one communication. The eNB may provide resources for ProSe UE-to-Network Relay one-to-one communication.

If Uu link quality is required for selection/reselection purposes is not yet decided. Further, the detailed criteria to select a new ProSe UE-to-Network Relay and the ranking of ProSe UE-to-Network Relays are not decided either.

When the Remote UE is in-coverage,
  transmission resources for ProSe UE-to-Network Relay discovery are provided by the eNB using broadcast for RRC_IDLE state and dedicated signalling for RRC_CONNECTED state.
  monitoring resources for ProSe UE-to-Network Relay discovery are provided by the eNB using broadcast signalling.

The remote UE can decide when to start monitoring for ProSe UE-to-Network Relay discovery. The Remote UE can transmit ProSe UE-to-Network Relay discovery solicitation message while in RRC_IDLE or in RRC_CONNECTED depending on the configuration of resources for ProSe UE-to-Network Relay discovery. The eNB may configure a threshold to control transmission of ProSe UE-to-Network Relay discovery solicitation message from the Remote UE. If the threshold is configured, the Remote UE is allowed to transmit ProSe UE-to-Network Relay discovery solicitation message only if the Uu link quality at the Remote UE is below the configured threshold.

QoS Support for ProSe

In Rel-13 QoS is supported generally for ProSe one-to-many communication. For that reason the so-called ProSe Per-Packet Priority (PPPP) was introduced, e.g. in TS 23.303. ProSe Per-Packet Priority is a scalar value associated with a protocol data unit, e.g. IP packet, that defines the priority handling to be applied for transmission of that protocol data unit, i.e. priority handling for transmissions on the PC5 interface. In other words, ProSe PPP is a mechanism used to allow prioritization of packets when using ProSe Direct Communication including for ProSe UE-to-UE and also for ProSe Relay.

When the ProSe upper layer (i.e. above PC5 access stratum) passes a protocol data unit for transmission to the PC5 access stratum, the ProSe upper layer provides a ProSe Per-Packet Priority from a range of 8 possible values.

The ProSe Per-Packet Priority is independent of the Destination Layer-2 ID and applies to both one-to-one and one-to-many ProSe Direct Communication. The ProSe Per-Packet Priority is selected by the application layer, e.g. based on various criteria that are outside the scope of this specification (such as delay requirements of the service like Voice packet transmissions or control signaling like floor control related signaling).

The ProSe Per-Packet Priority is independent of the mode in which the UE accesses the medium i.e. whether scheduled or autonomous resource allocation mode for ProSe communication is used. The ProSe access stratum uses the ProSe Per-Packet Priority associated with the protocol data unit as received from the upper layers to prioritize the transmission in respect with other intra-UE transmissions (i.e. protocol data units associated with different priorities awaiting transmission inside the same UE) and inter-UE transmissions (i.e. protocol data units associated with different priorities awaiting transmission inside different UEs).

Priority queues (both intra-UE and inter-UE) are expected to be served in strict priority order i.e. UE or eNB serves all packets associated with ProSe Per-Packet Priority N before serving packets associated with priority N+1 (lower number meaning higher priority).

The priority handling on the PC5 interface itself will be specified in TS36.321, i.e. logical channel prioritization LCP) procedure. Even though not all details are decided yet, for each sidelink logical channel there will presumably be an associated priority, e.g. similar to logical channel priority in legacy LTE UL operation. The creation of logical channels will be left to UE implementation, similar to Rel-12. In addition to taking source/destination ID of packets into account when creating a logical channel, the UE will also take into account the priority of packets. Essentially protocol data units having the same PPPP value (and some source/destination ID) will be served by one sidelink logical channel with a certain associated logical channel priority. The detailed relationship/mapping between PPPP and the logical channel priority is not yet fixed and will be further discussed in the standardization.

During logical channel prioritization procedure when the UE receives a SL grant, the UE selects the ProSe group having the sidelink logical channel with the highest PPPP among the sidelink logical channels having SL data, and then serves all sidelink logical channels belonging to the selected ProSe destination group in a decreasing priority order.

QoS Support for ProSe UE-to-Network Relay

For the ProSe UE-to-Network Relay scenario where a remote UE is communicating with a PDN via a ProSe UE-to-Network Relay there are further specific aspects for the provision of QoS. PPP is only applicable between the Remote UE and the Relay UE, whereas the usual prioritization mechanism (QCI, EPS bearers) can be used in the remaining part; FIG. 10 illustrates the different prioritization mechanism in the network. The data packets which are treated on the PC5 interface with a certain priority, i.e. PPPP, need to be also prioritized on the Uu interface between the eNB and the ProSe relay UE. This applies to both uplink and downlink transmission. Even though not all details are clear at this stage of the standardization, the following is currently the common assumption.

Uplink: The ProSe UE-Network Relay UE uses the uplink
    TFTs (traffic flow templates) to select the uplink EPS bearers for relayed uplink packets independently from the ProSe Per Packet Priority (PPPP) applied over the PC5 interface.

Downlink: The ProSe UE-Network Relay UE maps the EPS bearer QoS parameters into a ProSe Per-Packet Priority (PPPP) value to be applied for the downlink-relayed unicast packets over PC5. Appropriate mapping rules may be determined in the Relay UE based on the mapping between ProSe Per-Packet Priority and EPS bearer ID or IP 5 tuple for the uplink transmissions.

The relay needs to know the PPP of incoming packets on the sidelink to be able to select the proper QoS in the uplink to the eNB. In order to achieve this, each user plane PDCP PDU shall include the associated PPPP information, i.e. in the PDCP header. The Relay UE has to store the mapping between the PPPP of the PDCP packets received from the remote UE on a SLRB (Sidelink Radio Bearer) and the Uu bearer where it will be mapped to based on the UL TFT.

As mentioned above, in order to support QoS for the UE-to-network relay scenario, the Relay UE performs a mapping in the downlink direction from the QoS parameters (e.g. QCI value) of the bearers used over the Uu interface to the ProSe PPP value used over the PC5 interface. This basically requires the establishment of the appropriate dedicated bearers between the Relay UE and the PGW. FIG. 11 depicts one exemplary procedure to achieve this.

1. The Remote UE discovers the Relay UE, and the ProSe D2D connection between them is established over PC5. (The Remote UE receives an IP address/prefix as a result of the step.)

2. The Relay UE establishes a PDN connection for the Relay traffic.

NOTE: The order of step 1and 2 is not defined.

3. A dedicated bearer for signaling is created. This might be triggered by the GCS-AS (step 3a and step 3b) after receiving some application level signaling (e.g. registration request from the Remote UE) or there can be a default PCC rule that triggers the creation of a dedicated bearer for signaling.

4. The Remote UE joins an application level group using application level signaling. The signaling bearer can be used for this traffic.

5. At some point the GCS-AS indicates to the PCRF that a media bearer is needed. NOTE: In case of MCPTT, it depends on SA6 whether the MCPTT-AS or the IMS (P-CSCF) controls the PCRF. This decision does not change the principles of the procedure depicted 6. The PCRF starts an IPCAN session modification. It provides the details (TFT, QCI, BW) for the media bearer.

7. A dedicated bearer for media traffic is created or an existing one is modified (BW parameters are changed) if a bearer with the same QCI exists.

8. The media traffic is routed over the dedicated bearer created for the media. For uplink packets, the Remote UE (at application level) sets the ProSe PPP over PC5, and then, the Relay UE uses the appropriate EPS bearer based on the uplink TFTs. For downlink packets, the PGW selects the appropriate EPS bearer based on downlink TFTs, and then, the Relay UE sets the ProSe PPP over PC5 based on the QCI (and/or other QoS parameters) of EPS bearer that was used for the packet and the mapping info between PPPP and EPS bearer for uplink transmissions from Remote UE to Relay UE.

As mentioned above, the first application level signaling message(s) may have to use the default bearer, since dedicated bearers for application level signaling are not established yet. FIG. 12 discloses a corresponding exemplary message exchange.

1. The Remote UE discovers the Relay UE, and the ProSe D2D connection between them is established over PC5. (The Remote UE receives an IP address/prefix within this step.)

2. The Remote UE initiates application level signaling (e.g. starts registration) with a GCS-AS.

3. The GCS-AS decides that a dedicated bearer for signaling is needed. The GCS-AS sends the Bearer Info for the signaling bearer to PCRF2, which is in the HPLMN_Remote. PCRF2 forwards it to PCRF1, which is in HPLMN_Relay and the controls the IPCAN session of the Relay UE. The public IP address of the Remote UE is used as user session identifier.

4. PCRF1 identifies the IPCAN session of the Relay UE based on the public IP address of the Remote UE. IPCAN session modification is performed with the bearer parameters. QCI, BW and TFTs are coming from Bearer Info.

5. If the PGW has no dedicated bearer with the given QCI a new dedicated bearer is established between the PGW and Relay UE for the given QCI using BW and TFT(s) received in step 4. If the PGW has a dedicated bearer with the given QCI then the existing dedicated bearer is modified: BW is updated and new TFT is added.

As has been explained above, 3GPP introduces as a major work item the ProSe relay functionality, which includes relay discovery and relay direct communication. Some of the currently-defined mechanisms for ProSe relay are rather inefficient.

CITATION LIST

Non Patent Literature

NPL 1: 3GPP TS 36.211, "Evolved Universal Terrestrial Radio Access (E-UTRA); Physical Channels and Modulation", version 12.6.9
NPL 2: 3GPP TS 36.321, version 12.6.0
NPL 3: 3GPP TS23.203, version 13.4.0
NPL 4: 3GPP TR 36.843, version 12.0.1
NPL 5: 3GPP TS 36.300, version 13.3.0
NPL 6: 3GPP TS 36.212, version 12.4.0
NPL 6: 3GPP TS 23.303, version 13.0.0
NPL 8: 3GPP TR 23.713, version 1.4.0

SUMMARY

Non-limiting and exemplary embodiments provide improved methods for relaying protocol data units. The independent claims provide non-limiting and exemplary embodiments. Advantageous embodiments are subject to the dependent claims.

According to several aspects described herein, the relaying functionality of a relay-capable user equipment is improved, in particular the prioritization of protocol data units transmitted over the interface between the relay UE and the remote UE.

In order to discuss these aspects, the following assumptions are made. In particular, it is assumed that the relay user equipment is capable to perform direct communications with other remote user equipment(s) (i.e. via direct sidelink bearers). Communication between a remote UE and a radio base station (to which the relay UE is connected) is relayed by the relay UE which comprises exchanging protocol data units via the established direct sidelink bearer with the remote user equipment.

The first aspect relates to an improvement of the relaying functionality performed at the relay UE and assisted by the Remote UE as will be explained in the following. In particular, the relay UE has to relay protocol data units in both downlink and uplink directions, i.e. protocol data units received from the radio base station to be relayed to the Remote UE as well as protocol data units received from the Remote UE to be relayed to the radio base station. Furthermore, the relaying functionality has to make sure that the protocol data units are relayed/transmitted in both directions with a suitable priority (e.g. QoS as the transmission priority), i.e. the relay UE has to use a sidelink bearer with a suitable priority to forward a protocol data unit to the Remote UE and likewise has to use a radio bearer with a suitable priority (e.g. QoS) to forward a protocol data unit to the radio base station. Consequently, this makes it necessary that the relay UE knows which sidelink/radio bearers to use for the relaying depending on the priority of the received protocol data units. In the uplink, i.e. when relaying protocol data units received from the Remote UE to the radio base station, the bearer selection is performed by using particular packet filtering rules (also known as traffic flow templates in LTE implementations) which allowed the relay UE to select the appropriate radio bearer based on e.g. information included in the protocol data unit (e.g. its header) to be forwarded, such as the destination address, source address, port numbers and other information present in the protocol data unit. In other words, the bearer selection in the uplink is performed independently from the priority actually used between the Remote UE and the relay UE, although there should be a correspondence such that the packet filtering rules ensure that e.g. a high priority protocol data unit is transmitted via a radio bearer to the radio base station ensuring also a high priority (e.g. QoS attributes).

On the other hand, in the downlink, i.e. when relaying protocol data units received from the radio base station to the Remote UE, no such packet filtering rules are applicable. Instead, a priority shall be used to select the appropriate sidelink bearer over the sidelink interface and to transmit the data packets with the required transmission priority over the sidelink interface. The relaying functionality of the relay UE is assisted in that the Remote UE provides the relay UE with an indication of a priority associated with protocol data units that are transmitted by the Remote UE. The priority indication is transmitted within a control packet from the Remote UE to the relay UE. Taking into account that the priority differs between the different sidelink bearers to be used by the Remote UE to transmit protocol data units to the relay UE, the Remote UE transmits the control packet with the corresponding priority per sidelink bearer. Put differently, although in the following the aspect will be described with reference to one sidelink bearer only, the bearer selection respectively the selection of the priority of the protocol data units for the sidelink interface in the downlink at the relay UE is performed for each of the available sidelink bearers and is thus assisted by the Remote UE providing the corresponding information on the priority associated with these packets.

The relay UE associates the received priority of a sidelink bearer respectively of the protocol data units with the corresponding radio bearer (e.g. the bearer ID), used by the relay UE to transmit the corresponding protocol data units to which the priority indication refers to the radio base station. By thus establishing an association between the received priority and the used uplink radio bearer, the relay UE may later determine the priority of protocol data units received from the radio base station via a radio bearer so as to then use the corresponding sidelink bearer with the correct priority to forward/transmit the protocol data unit to the Remote UE.

In said respect it should be noted that the selection of an appropriate radio bearer to forward the protocol data units to the radio base station is performed by the relay UE upon receiving the corresponding protocol data unit from the Remote UE. Assuming that the control packet is transmitted by the Remote UE before any of the protocol data units are transmitted by the Remote UE to the relay UE, the relay UE has to store the received priority until it subsequently receives a first protocol data unit via said sidelink bearer in order to then be able to make the association between the priority and the selected radio bearer for relaying the protocol data unit to the radio base station.

As mentioned before, the Remote UE transmits a corresponding control packet with the priority indication for each of the sidelink bearers used by the Remote UE to transmit protocol data unit(s) to the relay UE. The transmission of the control packet can be done at the time when a sidelink bearer is created in the Remote UE; for instance, the control packet is transmitted to the Remote UE with the corresponding priority before any data protocol data unit is transmitted via said newly created sidelink bearer. By transmitting first the control packet with the priority it is ensured that the relay UE can create the association mentioned above as early as possible so as to allow proper prioritization of downlink PDUs received from the radio base station to be forwarded to the Remote UE.

Furthermore, the priority information stored in the relay UE should be kept updated so as to ensure proper prioritization between the Remote UE and the relay UE. For said reason, the Remote UE shall transmit a further control packet to the Remote UE every time the priority of a sidelink bearer is changed. In other words, depending on the implementation of the Remote UE, instead of creating new sidelink bearers to accommodate new priorities, an existing sidelink bearer may be modified by setting a new priority for said sidelink bearer. Also in this case the Remote UE may transmit a further control packet to the relay UE, such that the relay UE may establish a further association (or update the old association) between this new priority and the corresponding radio bearer selected by the relay UE to transmit protocol data units received via that modified sidelink bearer to the radio base station.

In a particular implementation of the first aspect, the control packet is a PDCP (packet data convergence protocol) control PDU which is specifically defined for the purpose of carrying the priority indication. Correspondingly, the PDCP control PDU can have a new format and a corresponding format indicator so as to allow the identification of the PDCP control PDU as the control packet carrying the priority indication as discussed above.

Moreover, the relay UE refers to the stored association in order to use the appropriate sidelink bearer to forward the protocol data units, received from the radio base station on a radio bearer, to the Remote UE. In case a suitable sidelink bearer with the necessary priority does not already exists, the relay UE may have to first establish a corresponding sidelink bearer with the determined priority, before being able to use same to forward the protocol data unit to the Remote UE. On the other hand, if a suitable sidelink bearer already exists with the necessary priority (e.g. sidelink bearer was already established when first protocol data units were received on that radio bearer), the relay UE may have to simply select same without the need to first create same.

In a further variant of the first aspect, the Remote UE will perform various repetitions of the control packet transmission (e.g. a predetermined number of times) so as to make sure that the control packet is successfully received in the relay UE.

In an alternative solution, the priority indication is not transmitted in a control packet but rather in a data packet. In more detail, a new data packet format, e.g. PDCP data PDU format, is defined which includes a corresponding field for the priority indication. Therefore, a data packet according to this new data packet format will not only include the usual data and other information (e.g. source, sequence number) but in addition comprises the priority indication. Furthermore, this data packet (e.g. PDCP data PDU) with the priority indication, will not be transmitted by the Remote UE at all times, but may only be transmitted when a new priority association has to be set up or updated in the relay UE, in a similar manner as with the control packet including the priority indication. For instance, assuming that a new sidelink bearer is set up by the Remote UE, the Remote UE will transmit the first data over this new sidelink bearer using the new data packet format so as to be able to additionally include the corresponding priority associated with this data and with the corresponding new sidelink bearer. As explained above, the relay UE will then make an appropriate association between the received priority and the corresponding radio bearer (ID) used by the relay UE to forward the corresponding data to the radio base station. Moreover, the new data packet format may be identified and distinguished by a corresponding new data format indicator, which may also be included in the data packet.

A second aspect similarly deals with the relay functionality offered by the relay UE to a remote UE and particularly improves the relaying of early application-level signaling messages from the relay UE to the radio base station. Similar assumptions as for the first aspect can be made for the second aspect. Furthermore, a scenario is assumed where application-level signaling is initiated by the Remote UE (e.g. by the higher layers of the Remote UE) which is then to be transmitted via the relay UE to the network. As explained in the background section, at this early stage in the application-level signaling exchange, no dedicated radio bearer for the application-level signaling is yet set up in said respect between the relay UE and the radio base station, such that a default bearer is used for forwarding the early application-level signaling messages from the relay UE to the radio base station. According to the second aspect, the application-level signaling messages are associated with a predetermined priority value known to both the Remote UE and the relay UE, the predetermined priority indicating to the relay UE that the corresponding application-level signaling shall be preferentially treated, by e.g. increasing the priority with which the application-level signaling is to be transmitted to the radio base station. Correspondingly, the early application-level signaling messages as well as the corresponding predetermined priority are transmitted to the relay UE. For instance, a particular (high-priority) sidelink bearer may be used by the Remote UE to transmit both to the relay UE. Upon its reception, the relay UE may then identify the predetermined priority and thus proceed to use the default radio bearer so as to transmit the application level signaling message to the radio base station with an increased priority, e.g. treated with the highest priority.

Furthermore, upon identifying the predetermined priority value, the relay UE will not store the predetermined priority in association with the corresponding default radio bearer used by the relay UE to forward the application-level signaling messages to the radio base station. Thus, it is avoided that a wrong prioritization of the corresponding downlink application-level signaling messages is performed at the relay UE. Instead, the relay UE, when receiving a corresponding downlink application-level signaling message to be forwarded to the Remote UE, will preferentially select a high-priority sidelink bearer for the relay to the Remote UE. In other words, instead of performing a bearer mapping in the relay UE, the relay UE will not have a suitable association set up to handle downlink application-level signaling messages and will thus use any suitable sidelink bearer to provide the messages to the Remote UE, wherein said sidelink bearer is optionally of a high priority to ensure proper and safe transmission.

Correspondingly, in one general first aspect, the techniques disclosed here feature a relay user equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. A receiver of the relay UE receives a control packet from the remote user equipment via a first sidelink bearer, the control packet comprising an indication of a priority associated with protocol data units transmitted by the remote user equipment via the first sidelink bearer. A processor of the relay UE stores an association between the priority indication received in the control packet and a first radio bearer used by the relay user equipment to relay the protocol data packets received from the remote user equipment to the radio base station. The processor determines, based on the stored association, the priority according to which a protocol data unit, that was received from the radio base station via the first radio bearer, should be transmitted to the remote user equipment. A transmitter of the relay UE relays the received protocol data unit to the remote user equipment using a second sidelink bearer that corresponds to the determined priority.

Correspondingly, in one general first aspect, the techniques disclosed here feature a method for operating a relay user equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. The method comprises the following steps. The relay UE receives a control packet from the remote user equipment via a first sidelink bearer, the control packet comprising an indication of a priority associated with protocol data units transmitted by the remote user equipment via the first sidelink bearer. The relay UE stores an association between the priority indication received in the control packet and a first radio bearer used by the relay user equipment to relay the protocol data packets received from the remote user equipment to the radio base station. The relay UE determines, based on the stored association, the priority according to which a protocol data unit, that was received from the radio base station via the first radio bearer, should be transmitted to the remote user equipment. The relay UE relays received protocol data unit to the remote user equipment using a second sidelink bearer that corresponds to the determined priority Correspondingly, in one general first aspect, the techniques disclosed here feature a remote user equipment for transmitting protocol data units to a relay user equipment connected to a radio base station within a mobile communication network. The relay user equipment relays communication between the remote user equipment and the radio base station and exchanges protocol data units over sidelink bearers with the relay user equipment. A transmitter of the Remote UE transmits a control packet to the relay user equipment via a first sidelink bearer, the control packet including an indication of a priority associated with protocol data units transmitted by the remote user equipment via the first sidelink bearer to the relay user equipment.

Correspondingly, in one general first aspect, the techniques disclosed here feature a method for operating a remote user equipment for transmitting protocol data units to a relay user equipment connected to a radio base station within a mobile communication network. The relay user equipment relays communication between the remote user equipment and the radio base station and exchanges protocol data units over sidelink bearers with the relay user equipment. The method comprises the following step. The remote UE transmits a control packet to the relay user equipment via a first sidelink bearer, the control packet including an indication of a priority associated with protocol data units transmitted by the remote user equipment via the first sidelink bearer to the relay user equipment.

Correspondingly, in one general first aspect, the techniques disclosed here feature a relay user equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. A receiver of the relay UE receives an application-level signaling message associated with a first predetermined priority. A processor of the relay UE, based on the first predetermined priority, determines to use a default bearer to transmit the application-level signaling message to the radio base station and to increase the priority with which the application-level signaling message is to be transmitted to the radio base station. A transmitter, of the relay UE transmits the application-level signaling message to the radio base station via the default bearer with the increased priority.

Correspondingly, in one general first aspect, the techniques disclosed here feature a method for operating a relay user equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. The method comprises the following steps. The relay UE receives an application-level signaling message associated with a predetermined priority. The relay UE determines, based on the predetermined priority, to use a default bearer to transmit the application-level signaling message to the radio base station and to increase the priority with which the application-level signaling message is to be transmitted to the radio base station. The relay UE transmits the application-level signaling message to the radio base station via the default bearer with the increased priority.

Correspondingly, in one general first aspect, the techniques disclosed here feature a remote UE for transmitting protocol data units to a relay user equipment connected to a radio base station within a mobile communication network. The relay user equipment relays communication between the remote user equipment and the radio base station and exchanges protocol data units over sidelink bearers with the remote user equipment. A processor of the remote UE determines a predetermined priority to be associated with an application-level signaling message to be transmitted to the relay user equipment. A transmitter of the remote UE transmits the application-level signaling message and the associated predetermined priority to the relay user equipment so as to indicate to the relay user equipment to increase the priority with which the application-level signaling message is to be transmitted to the radio base station.

Correspondingly, in one general first aspect, the techniques disclosed here feature a method for operating a remote user equipment for transmitting protocol data units to a relay user equipment connected to a radio base station within a mobile communication network. The relay user equipment relays communication between the remote user equipment and the radio base station and exchanges protocol data units over sidelink bearers with the remote user equipment, the method comprising the following steps. The remote UE determines a predetermined priority to be associated with an application-level signaling message to be transmitted to the relay user equipment. The remote UE transmits the application-level signaling message and the associated predetermined priority to the relay user equipment so as to indicate to the relay user equipment to increase the priority with which the application-level signaling message is to be transmitted to the radio base station.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF DRAWINGS

In the following exemplary embodiments are described in more detail with reference to the attached figures and drawings.

FIG. 1 shows an exemplary architecture of a 3GPP LTE system.

FIG. 2 shows an exemplary downlink resource grid of a downlink slot of a subframe as defined for 3GPP LTE (Release 8/9).

FIG. 3 illustrates the bearer architecture for LTE, including ProSe communication over the PC5 interface.

FIG. 4 schematically illustrates how to establish a layer-2 link over the PC5 for ProSe communication.

FIG. 5 illustrates the use of transmission/reception resources for overlay (LTE) and underlay (D2D) systems.

FIG. 6 illustrates the transmission of the Scheduling Assignment and the D2D data for two UEs.

FIG. 7 illustrates an exemplary architecture model for ProSe for a non-roaming scenario.

FIG. 8 illustrates cell coverage regarding four different states the D2D UE can be associated to.

FIG. 9 shows a ProSe UE-to-Network Relay scenario.

FIG. 10 shows the user plane protocol architecture for the ProSe UE-to-Network relay.

FIG. 11 is a signaling diagram for a ProSe session establishment.

FIG. 12 is a signaling diagram illustrating the exchange of application signaling between a Remote UE and the access network.

FIG. 13 is a sequence diagram of processing at the remote UE according to one implementation of the first embodiment.

FIG. 14 is a sequence diagram of processing at the relay UE according to one implementation of the first embodiment.

FIG. 15 illustrates an exemplary PDCP control PDU format carrying the PPP info according to one implementation of the first embodiment.

FIG. 16 is a signaling diagram illustrating the various signals and processing steps according to one implementation of the first embodiment.

FIG. 17 illustrates a PDCP data PDU format.

FIG. 18 illustrates an exemplary PDCP data PDU format carrying the PPP info according to one implementation of the first embodiment.

FIG. 19 is a sequence diagram of processing at the remote UE according to one implementation of the second embodiment.

FIG. 20 is a sequence diagram of processing at the relay UE according to one implementation of the second embodiment.

FIG. 21 is a signaling diagram illustrating the various signals and processing steps according to one implementation of the second embodiment.

DESCRIPTION OF EMBODIMENTS

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

A "relay user equipment" as used in the set of claims and in the application is to be broadly understood as referring to a user equipment which is capable of serving as a relay for another user equipment (termed "remote user equipment"). This also involves the capability of supporting direct communication transmissions directly between two user equipments (see below D2D or ProSe). In 3GPP terminology the relay user equipment is also referred to as ProSe UE-to-Network Relay. According to one implementation, the relay user equipment shall support relay functionality as defined for 3GPP LTE-A and as described in the background section. In said connection, the term "remote user equipment" shall merely indicate the role of the user equipment as being the peer of the relay user equipment, i.e. looking for a relay to establish direct communication with. More in particular, a "remote user equipment" is a ProSe-enabled Public Safety UE, that communicates with a PDN via a ProSe UE-to-Network Relay.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e. not via the radio base station (e.g. eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "relay functionality" as used in the set of claims and in the application is to be broadly understood as the capability of a user equipment to act as a ProSe UE-to-Network Relay. In one exemplary implementation, the relay functionality is the functionality currently being standardized in the 3GPP work item as explained in detail in the background section.

The term "application-level signaling" as used in the set of claims and in the application is to be broadly understood as application-related control signaling, e.g. signaling between the ProSe application in the UE and the ProSe Application Server over the PC1 interface as shown in FIG. 7. For example when a ProSe-enabled UE is joining an application level group, application level signaling is used.

3GPP is currently in the process of introducing a relay functionality for the ProSe-capable user equipments. Some initial agreements have been achieved already (some of which are explained in detail in the background section). In order to assist in the priority mechanism at the Relay UE, it was decided that each PDCP data PDU is extended with the ProSe per-packet-priority (PPPP) information, which then can be used in the Relay UE to map a Uu radio bearer to a suitable PC5 bearer (SLRB). Correspondingly, the PDCP data PDU header may contain the PPPP value which is associated to the PDCP SDU. The PPPP has eight possible values, distinguishable via four bits. The PDCP header is to be increased by a full octet so as to keep the PDU format byte-aligned. This in turn leads to a significant increase of signaling overhead, essentially one byte of overhead for each PDCP data PDU transmitted on the PC5 interface.

This is particularly detrimental taking further into account that the priority of a Sidelink radio bearer is basically semi-static and thus not changed dynamically.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel.12/13) environment. The various embodiments mainly provide an improved relaying functionality in a relay UE, i.e. an improved QoS support for the ProSe UE-to-Network Relay case, such that other functionality (i.e. functionality not changed by the various embodiments) may remain exactly the same as explained in the background section or may be changed without any consequences to the various embodiments.

A scenario may be assumed where user equipments are enabled to perform ProSe communication (ProSe-enabled UEs), i.e. direct D2D transmissions directly between UEs without the detour via the eNodeB. Furthermore, at least one of these (ProSe-enabled) UEs in the scenario shall support relay functionality as explained e.g. in the background section for the specific implementation in Release 13 of the 3GPP standard(s), and shall serve as the ProSe relay for at least one ProSe-enabled UE, termed in the following remote UE. Data is correspondingly exchanged via sidelink bearers between the remote UE and the relay UE, and is to be relayed by the relay UE in both uplink and downlink directions.

First Embodiment

In the following a first embodiment for solving the above-mentioned problem(s) will be described in detail. Different implementations of the first embodiment will be explained in detail below. According to the first embodiment, the relaying functionality performed by the relay UE is improved as will be explained in the following.

The relay functionality in the relay UE needs to properly handle data with different priorities. As explained in the background section, the legacy priority mechanism is based on the QoS/QCI attributes and shall be applied between the relay UE and the core network. Correspondingly, each radio/EPS bearer is associated with a particular QCI and fulfills a particular set of QoS requirements.

On the other hand, priority handling via the PC 5 interface shall be based on a ProSe per-packet priority (PPPP) (or simply per-packet priority, PPP). The corresponding sidelink bearers are established so as to fulfill the particular priority PPPP requirements. As explained in the background section, it is currently assumed that there will be one sidelink bearer per PPPP. More in particular, a sidelink bearer is configured by establishing PDCP/RLC entities for the combination of Source ID/Destination ID/PPP, and allocating an LCID (Logical Channel ID) for the logical channel of the sidelink bearer. For instance, when the ProSe application layer provides a data packet to the lower layers (e.g. the PDCP layer) in the remote UE, it also provides a corresponding per-packet priority which is to be used to select/establish a suitable sidelink bearer to transmit the data packet to the relay UE according to the priority.

Consequently, the priority handling via the PC5 interface is different from the priority handling throughout the rest of the radio and core network. The relay UE needs to make sure that data packets are transmitted with the correct priority (be it PPPP, or QCI/QoS) and thus has to use suitable sidelink/ radio bearers that fulfill the QoS/priority requirements to transmit the data.

It should be further noted that the priority handling at the relay UE may differ significantly between uplink and downlink data. In particular, when the relay UE receives data from the remote UE, it needs to determine which radio bearer to use for forwarding the data to the eNodeB. This determination is for example done based on traffic flow templates (TFT) stored/configured in the relay UE for this purpose; namely, the traffic flow templates provide packet filtering rules according to which the relay UE can determine a radio bearer (with corresponding QCI attributes) via which the data is to be transmitted to the eNB. For instance, the IP destination address, IP source address, port number and/or other information of the data can be compared with the traffic flow templates to determine the suitable radio bearer. In one implementation, the TFTs are provided by the PCRF, which determines the QoS parameters for the bearer based e.g. on subscription information received from the Subscriber Profile Repository (SPR) when the bearer is activated.

By considering this data information against the traffic flow templates for the uplink bearer mapping in the relay UE, the relay UE makes sure that a radio bearer is used which suffices the QoS requirements.

On the other hand, when the relay UE receives the data from the eNodeB, it needs to determine a suitable sidelink bearer to use for forwarding the data to the remote UE. As mentioned above, the priority handling on the PC5 interface is based on the per-packet priority that is however not transmitted together with the downlink data from the eNodeB (in contrast to when the remote UE needs to select/ establish a sidelink bearer to the relay UE based on the PPPP provided by the higher ProSe application layer). Instead, the relay UE is to perform a bearer mapping based on a previously established and stored association between the PPPP and the radio bearer used to transmit the data on the Uu interface. This association links a particular PPPP with a radio bearer (e.g. its bearer ID), such that the relay UE, when receiving downlink data via a radio bearer, may determine the corresponding priority (PPPP) associated with said radio bearer why of which the data was received from the eNodeB. Upon determining the PPPP, the relay UE may use an appropriate sidelink bearer for transmitting the downlink data to the remote UE, the appropriate sidelink bearer complying with the requirements of the determined PPPP. In said respect, it should be noted that the relay UE may also have to first establish such a sidelink bearer for the determined PPPP, if a suitable sidelink bearer is not yet available.

In said respect it should be also noted that the sidelink bearer used by the remote UE to transmit data to the relay UE may be different from the sidelink bearer used by the relay UE to transmit data to the remote UE. In other words, although the respective data to be transmitted has the same PPPP, different sidelink bearers may be used by the remote UE and relay UE for the respective transmission direction. One reason is that the sidelink bearers in general may not necessarily be bidirectional but only be unidirectional.

In order to establish the association between a priority (PPPP) and a radio bearer for the purpose of downlink bearer mapping (respectively priority handling) in the relay UE, the remote UE will inform the relay UE about the PPPP of data which it transmits via a sidelink bearer to the relay UE. The relay UE may then determine the particular radio bearer via which it forwards said data to the eNodeB, and may establish a mapping between the determined radio bearer and the corresponding PPPP.

To said end, the remote UE generates and transmits a PDCP control PDU packet to the relay UE comprising the corresponding priority, PPPP. This new PDCP control PDU is specifically defined so as to carry the priority (PPPP) associated with the sidelink radio bearer to the relay UE. According to one implementation, the new PDCP control PDU will be identified by a specific PDCP SDU type. In particular, up to now only two different PDCP SDU types are defined, as apparent from the following table:

TABLE 1

Table: PDCP SDU Types

| Bit | Description |
|---|---|
| 000 | IP |
| 001 | ARP |
| 010-111 | reserved |

As apparent, the 3-bit SDU type field allows to distinguish between IP packets and Address Resolution Protocol (ARP) packet. Address Resolution Protocol (ARP) is for example used in D2D communication for dynamic configuration of IPv4 address if the IP address is not configured.

According to an exemplary implementation of the first embodiment, a new SDU type is introduced, as apparent from the following table (see underlined).

TABLE 2

Table: PDCP SDU Types according to first embodiment

| Bit | Description |
|---|---|
| 000 | IP |
| 001 | ARP |
| 010 | PPP info |
| 011-111 | Reserved |

The new SDU type is exemplarily named "PPP info" and is correspondingly intended to carry the PPP info, i.e. priority information associated to the packets of a sidelink radio bearer. In the above table, exemplarily the bit pattern 010 is used to identify a "PPP info" PDCP control PDU.

An example of a PDCP control PDU according to this new SDU type is illustrated in FIG. 15. As apparent therefrom, the PDCP control PDU comprises the SDU type field which would carry the exemplary bits "010" to identify the PDU to be of type "PPP info", and further comprises the PPP info itself. The remaining bits to fill the octet may be considered as being reserved and may be usable in the future. The PPP info having 3 bits is merely an example, and thus alternatively, more or less bits may be provided for the PPP info field. This example of a PDCP control PDU assumes that no ciphering is applied. Correspondingly, the PDCP layer, when being triggered to send such a PDCP control PDU, submits to the lower layers the PDCP control PDU without associating it with a PDCP sequence number nor performing ciphering.

This PDCP control PDU will be transmitted by the remote UE to the relay UE only at specific points in time, e.g. only when this PPP information is actually required in the relay UE. For instance, the PDCP control PDU with the PPP info may only be transmitted from the remote UE to the relay UE when data with a new PPP is transmitted by the remote UE to the relay UE. This may be the case when data is to be transmitted according to a particular priority for which no suitable sidelink bearer (i.e. suitably having the particular priority) is available for the remote UE to transmit said data to the relay UE. Correspondingly, the remote UE, when determining that this is a new priority (in other words that a new sidelink bearer with the corresponding priority is needed), will establish such a sidelink bearer having this particular priority (either by establishing a completely new sidelink bearer, or by modifying a previously-established sidelink bearer to have this particular priority). Upon establishing this new sidelink bearer for the new priority, the remote UE shall inform the relay UE about this new/modified priority to have a corresponding association in the relay UE. To said end, the remote UE generates the new PDCP control PDU comprising the new priority value in the "PPP info" field, and transmits same to the relay UE via the new/modified sidelink bearer. Also, the remote UE transmits the data with said new priority via the new/modified sidelink bearer, which is suitable to transmit data with said priority. At the relay UE side, the relay UE will again establish an association between the PPP received in the new PDCP control PDU and the radio bearer selected by the relay UE to transmit the data (received from the remote UE via the new/modified sidelink bearer) to the eNB.

Consequently, by only transmitting the PDCP control PDU at specific points in time when it is actually required in the relay UE, the overhead may be kept at a minimum.

Since the PPP info is needed at the relay UE so as to properly handle downlink data prioritization (i.e. select appropriate side link bearer with correct PPP), the PDCP control PDU may be transmitted as soon as possible by the remote UE, e.g. immediately after establishing the new sidelink bearer and before starting with the transmission of the corresponding data. On the other hand, in order for the relay UE to be able to establish a corresponding association, data packets have to be transmitted by the remote UE as well since only at that point of time the relay UE will determine the suitable radio bearer (based on that traffic flow templates as explained above). Therefore, the PDCP control PDU with the PPP info may be transmitted at a similar point of time as the data, i.e. either shortly before or after transmitting the first data packets over the newly established sidelink bearer with the new priority.

Alternatively, the PDCP control PDU may additionally comprise the necessary information from the data (e.g. from its header) such that the first data packet is not necessary at the relay UE to determine the radio bearer which would be eventually used to later transmit the data, thus allowing to establish the association immediately upon receiving this extended PDCP control PDU.

In an alternative implementation of the first embodiment, the PDCP control PDU is transmitted not only once, but a predetermined number of times so as to increase the likelihood that same is successfully received in the relay UE. For example, the predetermined number of times may be specified by the eNodeB or may be preconfigured, e.g. for out of coverage operation.

FIG. 13 is a sequence diagram illustrating the processing of part of the functionality at the remote UE according to a specific implementation of the first embodiment as discussed above. As apparent from FIG. 13, the repetition of the control packet transmission is illustrated with dashed lines so as to indicate that this step is optional. Likewise, the dashed arrow between the step of transmitting the control packet and the transmission of data packet shall indicate that optionally the transmission of the data packet(s) may be subsequent to the transmission of the control packet carrying the priority info.

FIG. 14 is a sequence diagram illustrating the processing of part of the relay functionality at the relay UE according to a specific implementation of the first embodiment as discussed above. The illustration of the relay UE processing assumes a parallel processing of the uplink and downlink data packets such that the corresponding threads are kept separate. However, so as to be able to determine the priority of a downlink data packet, the relay UE has to have a corresponding association already stored which is performed according to the left-hand thread of FIG. 14. On the other hand, the relay UE handling of the PDCP control PDU (control packet in FIG. 14) is interlinked with the uplink data processing so as to indicate that at least once the relay UE needs to determine the radio bearer for the relay of the uplink data packet to allow the relay to establish and store the association between the priority info and the corresponding selected (uplink) radio bearer.

FIG. 16 is a signaling diagram illustrating an exemplary implementation of the first embodiment as discussed above. As apparent from FIG. 16, it is assumed that a PPP priority with the value 6 is carried by the PDCP control PDU to the relay UE. This particular example assumes that both the control packet as well as the data are transmitted by the remote UE via the sidelink radio bearer with ID=1. Upon receiving the data, the relay UE will select the appropriate radio bearer to transmit the data to the eNodeB based on the rules given by e.g. the traffic flow templates as explained above. In this particular case, the radio bearer with ID=1 is assumed to be used. Correspondingly, the association established by the relay UE will link the priority value 6 with the radio bearer ID 1. Consequently, when later receiving data from the radio base station via the radio bearer with ID=1, the relay UE will be able to determine the correspondingly correct priority of said data by referring to the stored association(s) and identifying the priority that is associated with the radio bearer ID 1. The relay UE will thus learn that the data received from the eNodeB shall be transmitted according to the priority value 6 (i.e. PPPP=6) to the remote UE, and will accordingly select a suitable sidelink bearer with the priority value 6. It is assumed that the relay UE will thus transmit said data via the sidelink the radio bearer with ID=3 to the remote UE.

The above description of the first embodiment basically was focusing on a single sidelink bearer used by the remote UE to transmit data to the relay UE. However, the above principles of the first embodiment (and any of its variants and implementations) can be applied to each of a plurality of sidelink bearers established by the remote UE to transmit data to the relay UE (each of the sidelink bearers for a given source/destination is corresponding to a different priority, PPP). Correspondingly, the remote UE can transmit at least one PDCP control PDU to the relay UE per sidelink bearer used to transmit data to the relay UE, since different sidelink bearers will be associated with different priorities, and thus the data which is transmitted via said different sidelink bearers will also be handled differently at the relay UE when determining which radio bearer to use for transmitting same to the eNodeB. The relay UE correspondingly may store several different associations so as to handle all the different data that are received from the eNodeB and are to be forwarded to the remote UE.

According to an alternative implementation of the first embodiment, instead of using a control packet to carry the PPP information from the remote UE to the relay UE, a data packet may be used in said respect. Correspondingly, the remote UE will transmit the PPP information together with data to the relay UE via the corresponding sidelink bearer that fulfills the corresponding PPP requirements. To said end, in one variant a new PDCP data PDU format is defined, which additionally includes a field for carrying the PPP information. As discussed already in connection with the new PDCP control PDU format, a new SDU type may be defined that also allows to carry the PPP information in addition to the usual fields defined for a "normal" PDCP data PDU.

FIG. 17 discloses the PDCP data PDU format as currently defined for carrying PDCP data PDUs. As apparent therefrom, the format comprises the following fields:
- the SDU type for indicating that the PDU carries IP data (see above table bit pattern "000"),
- the PGK (ProSe Group Key) index for ciphering,
- the PTK (ProSe Traffic Key) identity for ciphering,
- the PDCP sequence number
- IP data FIG. 18 discloses a new PDCP data PDU format extended so as to also be able to carry the priority information, see field "PPP info". It should be noted that in order to be byte aligned, the remaining bits of the octet nr. 6 are to be reserved as well. The SDU type of this new PDCP data PDU format may be defined as in the following exemplary table:

TABLE 3

Table: PDCP SDU Types according to a variant of first embodiment

| Bit | Description |
| --- | --- |
| 000 | IP |
| 001 | ARP |
| 010 | IP with PPP info |
| 011-111 | Reserved |

As already discussed before in connection with the first embodiment, the PPP information transmitted within this new PDCP data PDU (together with the first data) can be used by the relay UE to generate a corresponding association between the PPP value and the radio bearer determined to be used to forward the data, also received in this new PDCP data PDU, to the eNodeB. In the same manner as discussed before, the relay UE may then use the established association to perform a suitable downlink bearer mapping so as to properly prioritize and relay downlink data received from the eNodeB to the remote UE.

As already discussed before in connection with the first embodiment, the new PDCP data PDU additionally carrying the PPP info may not be used all the time but only at particular points in time when the PPP info is actually required in the relay UE. For instance, the new PDCP data PDU format shall be used at the beginning (e.g. together with the first (few) IP packet(s)) when a new sidelink bearer is established so as to inform the relay UE about the new priority associated with this new sidelink bearer and the data transmitted via same. Again, the overhead generated by additionally transmitting the PPP info from the remote UE to the relay UE will thus be kept at a minimum.

Second Embodiment

In the following a second embodiment is presented which deals with a problem which is different to the one underlying the first embodiment. The second embodiment can be used stand-alone or together (i.e. in combination) with the first embodiment, as will become apparent from the below description of the second embodiment.

The same assumptions as made for the first embodiment can be made for the second embodiment too. In particular, the ProSe-enabled relay UE is assumed to be able to properly prioritize uplink data based on the QoS/QCI attributes and suitable traffic flow templates (TFT) and to prioritize downlink data based on a ProSe per-packet priority (PPPP) and previously-established priority-vs-radio bearer association(s). The relay UE shall transmit data packets with the correct priority (be it PPPP, or Logical Channel priority) and thus has to use suitable sidelink/radio bearers that fulfill the priority requirements for transmitting the data. For more details, reference is made to the assumptions provided for the first embodiment which shall be equally considered applicable to the second embodiment.

As explained in detail with respect to the first embodiment, a priority-vs-radio bearer association is established in the relay UE so as to allow a proper downlink mapping between a radio bearer and a PPP (priority over PC5 interface) and thus a (downlink) sidelink bearer. Correspondingly, the relay UE is provided with the priority information (PPPP info) for the sidelink bearer (which also refers to the data transmitted via said sidelink bearer) such that the relay UE may then associate the received priority value with the radio bearer (e.g. ID) used by the relay UE to forward/transmit said data (received from the remote UE via said sidelink bearer to which the priority refers) to the eNB. The first embodiment suggests various ways to provide this PPP information to the relay UE, and thus the first embodiment can be used in combination with the second embodiment. However, the second embodiment is not limited in said respect, and any other way (different from the first embodiment) of providing the PPP info to the relay UE may be envisaged, and thus the second embodiment is stand-alone.

As discussed in connection with FIG. 12, when application-level signaling is initially transmitted by the remote UE, no dedicated radio bearer for signaling is available via which the relay UE may transmit same to the eNodeB; no dedicated EPS bearer for signaling is available between the relay UE and the SGW/PGW. Consequently, the relay UE uses the default radio bearer (which is basically always established and available) in said respect, with the disadvantage that the application-level signaling (which is actually of high priority) is transmitted with less priority in the radio and core network. In other words, the actually-required QoS for the application-level signaling might not be supported by the default radio/EPS bearers.

Another problem is connected with how the relay UE performs the relaying functionality for downlink data based on a corresponding association. As explained before, in the relay UE an association would be established for the downlink bearer mapping linking the priority (PPPP) given to the application-level signaling and the default radio bearer (used by the relay UE to transmit the application-level signaling to the eNB). However, this association is not correct since the high priority of the application-level signaling would be linked to the default radio bearer associated with a lower priority. Rather, the application-level signaling should be mapped on a dedicated (radio/EPS) bearer with the priority actually corresponding to this application-level signaling, e.g. QCI=69 in case of MCPTT.

According to the second embodiment, a predetermined priority (PPPP) value is used by the remote UE in connection with the first application-level signaling message(s), the predetermined priority triggering a preferential handling at the relay UE as will be explained in the following. It is assumed that application-level signaling is to be transmitted by the remote UE, e.g. for starting registration with a GCS-AS (group communication system application server). The corresponding ProSe application layer, initiating the application-level signaling, assigns a predetermined priority (PPPP value) to the application-level message(s) depending on whether or not a dedicated radio bearer is available for carrying the application-level signaling between the relay UE and the eNodeB. In particular, at the beginning of the application-level signaling, the remote UE may assume that no dedicated radio bearer is yet available at the relay UE. In other words, the remote UE (particularly the ProSe application layer) will assume that no dedicated radio bearer is available at the relay UE to carry the application-level signaling as long as it has not received an indication to the contrary.

Consequently, particularly for the first application-level signaling message(s) the remote UE will select the predetermined priority value (PPPP) to further determine how to transmit same to the relay UE via the PC5 interface. Correspondingly, both the predetermined priority value as well as the actual application-level signaling message(s) are transmitted to the relay UE. For example, any available sidelink bearer may be used to transmit the application-level messages to the relay UE. Optionally, the remote UE may select/establish a sidelink bearer with a high priority for carrying the application-level signaling to the relay UE.

In turn, the relay UE receiving both the predetermined priority value and the application-level signaling message(s) will learn from the predetermined priority value that the messages are to be treated preferentially. The preferential treatment entails increasing the priority with which the application-level signaling would be transmitted via the default radio bearer to the eNodeB. For instance, the logical channel priority is increased (temporarily) for the application-level signaling messages. According to one exemplary implementation, the default radio bearer used for the transmission of the application level signaling message(s) will be treated with the highest logical channel priority during the LCP procedure performed in the Relay UE for the uplink transmissions. More in particular, the logical channel priority configured for the default bearer is changed temporarily, i.e. for the transmission of the application level signaling message(s).

Therefore, the relay UE will transmit the application-level signaling message(s) via the default radio bearer but with an increased priority, since these messages are treated preferentially during the LCP procedure.

Furthermore, when the relay UE identifies the predetermined priority value, it does not create an association between this (predetermined) priority value and the default radio bearer, contrary to its normal operation. Therefore, the downlink bearer mirroring performed at the relay UE to identify a suitable priority/sidelink bearer to forward downlink application-level signaling to the remote UE, at least at the beginning, can not rely on such an association. When the relay UE receives an application-level signaling message from the eNodeB via a radio bearer, the relay UE will determine whether or not a corresponding priority-vs-radio bearer association is available in the relay UE. In case no such association is available, the relay UE may select any of the available sidelink bearers to transmit the application-level signaling message to the remote UE. Optionally, the relay UE shall use a high priority sidelink bearer, and if no such bearer is available, it shall first establish one for the purpose of transmitting the application-level signaling message to the remote UE.

As already discussed in connection with FIG. 12, during the application-level signaling a dedicated radio/EPS bearer will be established eventually, which shall then be used to transport the remaining application-level signaling messages instead of continuing to use the default radio/EPS bearer. For instance, when assuming MCPTT (mission critical push-to-talk), the QCI-parameter of the may be QCI=69. For the purposes of the second embodiment it is assumed that the remote UE will somehow learn about the successful establishment of a dedicated (data) radio bearer for signaling. For example, upon successfully establishing said dedicated (data) radio bearer, the relay UE may transmit a particular indication to the remote UE (e.g. via the PC5-S protocol). Alternatively, the application layer in the remote UE will know based on received response message(s) that a dedicated radio bearer was established. Consequently, the remote UE will thus learn about the new dedicated radio bearer available to the relay UE, and will thus cease to use the predetermined priority value to transmit uplink application-level signaling messages to the relay UE. Instead, the remote UE will use the required priority value which usually corresponds to the application-level signaling. Consequently, the appropriate sidelink bearer supporting said required priority will be selected/established by the remote UE so as to transmit subsequent application-level signaling messages to the relay UE.

As before, also this new, required, priority value will be transmitted by the remote UE to the relay UE, separately from or together with the application-level signaling message.

In turn, the relay UE will perform the usual radio bearer selection based e.g. on the TFTs, to select the newly-established dedicated radio bearer, via which the application-level signaling messages are then transmitted from the relay UE to the eNodeB. Also, in order to assist in supporting a proper bearer mapping in the downlink, the received priority associated with the application-level signaling will be stored and linked with the dedicated radio bearer, as explained in detail before. Consequently, when receiving application-level signaling from the eNodeB in the downlink via a radio bearer, the relay UE will identify a particular association and will thus determine the correct priority (PPPP) associated with said radio bearer, to be used to transmit the application-level signaling via the PC5 interface. A corresponding sidelink bearer supporting the determined priority over the PC5 interface is selected and used by the relay UE for carrying the application-level signaling, received from the eNodeB, to the remote UE.

FIG. 19 is a sequence diagram illustrating part of the processing of the functionality at the remote UE according to a particular implementation of the second embodiment as discussed above. FIG. 20 is a sequence diagram illustrating part of the processing of the relay functionality at the relay UE according to a particular implementation of the second embodiment as discussed above. FIG. 21 is a signaling diagram illustrating the exchange of messages and the processing steps according to a particular implementation of the second embodiment.

The predetermined priority has a value which is outside a range of valid values usually used for the priority and is known to both the remote UE and the relay UE. For instance, at the moment 8 different PPP values are normally used, distinguishable with 3 bits. In order to further identify a predetermined priority value, while being able to continue to use all of the 8 PPP values, 4 bits may be used to define the PPP values according to the second embodiment. Consequently, values 0-7 (e.g. 0000-0111) can be regarded as the values normally used during prioritization, while any of the values 8-15 (1000-1111) outside this valid range of values can be used as the predetermined priority value according to the second embodiment.

Further Embodiments

According to a first aspect, a relay user equipment is provided for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. A receiver of the relay UE receives a control packet from the remote user equipment via a first sidelink bearer, the control packet comprising an indication of a priority associated with protocol data units transmitted by the remote user equipment via the first sidelink bearer. A processor of the relay UE stores an association between the priority indication received in the control packet and a first radio bearer used by the relay user equipment to relay the protocol data packets received from the remote user equipment to the radio base station. The processor determines, based on the stored association, the priority according to which a protocol data unit, that was received from the radio base station via the first radio bearer, should be transmitted to the remote user equipment. A transmitter of the relay UE relays the received protocol data unit to the remote user equipment using a second sidelink bearer that corresponds to the determined priority.

According to a second aspect which is provided in addition to the first aspect, the control packet is a Packet Data Convergence Protocol, PDCP, control PDU intended for carrying the indication of the priority. The PDCP control PDU further comprises a format indicator. Correspondingly, the processor of the relay UE determines that the received PDCP control PDU is intended for carrying the indication of the priority based on the format indicator comprised in the received PDCP control PDU.

According to a third aspect which is provided in addition to the first or second aspects, the processor of the relay UE determines the first radio bearer to be used for relaying the protocol data unit to the radio base station based on information included in the protocol data unit received from the remote user equipment and corresponding packet filter rules stored in the relay user equipment, The transmitter of the relay UE transmits the protocol data unit to the radio base station using the determined first radio bearer. Optionally, the processor of the relay UE generates and stores the association between the priority indication received in the control packet and the first radio bearer only after determining the first radio bearer for a first one of a plurality of protocol data units received from the remote user equipment via the first sidelink bearer.

According to a fourth aspect which is provided in addition to one of the first to third aspects, the relay user equipment, upon receiving the protocol data unit from the radio base station, either
   sets up a new second sidelink bearer with the determined priority, when no sidelink bearer with the determined priority is available, or
   selects the second sidelink bearer corresponding to the determined priority, when a sidelink bearer with the determined priority is available, so as to relay the received protocol data unit to the remote user equipment.

According to a fifth aspect which is provided in addition to one of the first to fourth aspects, the association stored in the relay user equipment associates the priority indication received in the control packet with an identity of that radio bearer being used by the relay user equipment to transmit the received protocol data unit to the radio base station.

According to a sixth aspect which is provided in addition to one of the first to fifth aspects, the receiver of the relay UE receives a further control packet from the remote user equipment via a further sidelink bearer, the further control packet comprising a further indication of a priority associated with protocol data units transmitted by the remote user equipment via the further sidelink bearer. The processor of the relay UE stores a further association between the further priority indication received in the further control packet and a second radio bearer used by the relay user equipment to relay the protocol data packets received from the remote user equipment via the further sidelink bearer to the radio base station. The processor of the relay UE determines, based on the stored further association, the priority according to which a further protocol data unit, that was received from the radio base station via the second radio bearer, should be transmitted to the remote user equipment. The transmitter of the relay UE relays the received protocol data unit to the remote user equipment using a further sidelink bearer that corresponds to the determined further priority.

According to a seventh aspect, a method for operating a relay user equipment is provided equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. The method comprises the following steps. The relay UE receives a control packet from the remote user equipment via a first sidelink bearer, the control packet comprising an indication of a priority associated with protocol data units transmitted by the remote user equipment via the first sidelink bearer. The relay UE stores an association between the priority indication received in the control packet and a first radio bearer used by the relay user equipment to relay the protocol data packets received from the remote user equipment to the radio base station, The relay UE determines, based on the stored association, the priority according to which a protocol data unit, that was received from the radio base station via the first radio bearer, should be transmitted to the remote user equipment. The relay UE relays received protocol data unit to the remote user equipment using a second sidelink bearer that corresponds to the determined priority.

According to an eighth aspect, the remote user equipment is provided for transmitting protocol data units to a relay user equipment connected to a radio base station within a mobile communication network, wherein the relay user equipment relays communication between the remote user equipment and the radio base station and exchanges protocol data units over sidelink bearers with the relay user equipment. The remote UE comprises a transmitter which transmits a control packet to the relay user equipment via a first sidelink bearer, the control packet including an indication of a priority associated with protocol data units transmitted by the remote user equipment via the first sidelink bearer to the relay user equipment.

According to a ninth aspect which is provided in addition to the eighth aspect, the transmitter of the remote UE transmits a control packet to the relay user equipment when the priority of a protocol data unit to be transmitted to the relay user equipment via the first sidelink bearer changes.

According to a tenth aspect, which is provided in addition to the ninth aspect, a processor of the remote UE determines that a protocol data unit is to be transmitted to the remote user equipment, the protocol data unit being associated with a priority. The processor of the remote UE determines that there is no sidelink bearer that corresponds to the priority with which the protocol data unit is to be transmitted to the relay user equipment. Upon this determination, the processor sets up a sidelink bearer to the relay user equipment corresponding to said priority, and the transmitter transmits the control packet comprising the priority to the remote user equipment via the set-up sidelink bearer before transmitting the protocol data unit to the remote user equipment via the set-up sidelink bearer.

According to an eleventh aspect, which is provided in addition to one of the eighth to tenth aspects, the transmitter, when in operation, transmits the control packet a predetermined number of times.

According to a twelfth aspect, a method is provided for operating a remote user equipment for transmitting protocol data units to a relay user equipment connected to a radio base station within a mobile communication network. The relay user equipment relays communication between the remote user equipment and the radio base station and exchanges protocol data units over sidelink bearers with the relay user equipment. The method comprises the following step. The remote UE transmits a control packet to the relay user equipment via a first sidelink bearer, the control packet including an indication of a priority associated with protocol data units transmitted by the remote user equipment via the first sidelink bearer to the relay user equipment.

According to a thirteenth aspect, a relay user equipment is provided for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. A receiver of the relay UE receives an application-level signaling message associated with a first predetermined priority. A processor of the relay UE, based on the first predetermined priority, determines to use a default bearer to transmit the application-level signaling message to the radio base station and to increase the priority with which the application-level signaling message is to be transmitted to the radio base station. A transmitter of the relay UE transmits the application-level signaling message to the radio base station via the default bearer with the increased priority.

According to a fourteenth aspect, which is provided in addition to the thirteenth aspect, the processor of the relay UE does not store the first predetermined priority in association with the default bearer. The processor of the relay UE determines a sidelink bearer to be used for transmitting a further application-level signaling message, received from the radio base station via the default radio bearer, to the remote user equipment, preferably wherein the determined sidelink bearer has a high priority. Correspondingly, the transmitter of the relay UE transmits the further application-level signaling message to the remote user equipment using the determined sidelink bearer.

According to a fifteenth aspect which is provided in addition to the thirteenth or fourteenth aspect, a dedicated signaling radio bearer is set up between the relay user equipment and the radio base station to be used for transmitting further application-level signaling messages. Upon setting up the dedicated signaling radio bearer, the relay user equipment transmits an application-level signaling message to the remote user equipment using a further sidelink bearer associated with a further priority different from the predetermined priority.

According to a sixteenth aspect which is provided in addition to one of the thirteenth to fifteenth aspects, the processor of the relay UE increases the priority with which the application-level signaling message is transmitted to the radio base station, by increasing the priority used during a logical channel prioritization procedure in connection with the application-level signaling message.

According to a seventeenth aspect, a method is provided for operating a relay user equipment for relaying protocol data units exchanged with a remote user equipment within a mobile communication network. The relay user equipment is connected to a radio base station. The relay user equipment relays communication between the remote user equipment and the radio base station and exchanges the protocol data units over sidelink bearers with the remote user equipment. The method comprises the following steps. The relay UE receives an application-level signaling message associated with a predetermined priority. The relay UE determines based on the predetermined priority, to use a default bearer to transmit the application-level signaling message to the radio base station and to increase the priority with which the application-level signaling message is to be transmitted to the radio base station. The relay UE transmits the application-level signaling message to the radio base station via the default bearer with the increased priority.

According to an 18 aspect, a remote user equipment is provided for transmitting protocol data units to a relay user equipment connected to a radio base station within a mobile communication network. The relay user equipment relays communication between the remote user equipment and the radio base station and exchanges protocol data units over sidelink bearers with the remote user equipment. A processor of the remote user equipment determines a predetermined priority to be associated with an application-level signaling message to be transmitted to the relay user equipment. A transmitter of the remote UE transmits the application-level signaling message and the associated predetermined priority to the relay user equipment so as to indicate to the relay user equipment to increase the priority with which the application-level signaling message is to be transmitted to the radio base station.

According to a nineteenth aspect, which is provided in addition to the eighteenth aspect, the remote user equipment uses a sidelink bearer with a high priority to transmit the application-level signaling message with the associated predetermined priority to the relay user equipment.

According to a twentieth aspect, which is provided in addition to the eighteenth or nineteenth aspects, the predetermined priority is set for the application-level signaling message so as to indicate that the relay user equipment shall not store the first predetermined priority in association with a default bearer to be used by the relay user equipment to transmit the application-level signaling message to the radio base station.

According to a 21st aspect, a method is provided for operating a remote user equipment for transmitting protocol data units to a relay user equipment connected to a radio base station within a mobile communication network. The relay user equipment relays communication between the remote user equipment and the radio base station and exchanges protocol data units over sidelink bearers with the remote user equipment. The method comprises the following steps. The remote UE determines a predetermined priority to be associated with an application-level signaling message to be transmitted to the relay user equipment. The remote UE transmits the application-level signaling message and the associated predetermined priority to the relay user equipment so as to indicate to the relay user equipment to increase the priority with which the application-level signaling message is to be transmitted to the radio base station.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be re-configured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A relay user equipment for relaying protocol data units exchanged with a remote user equipment within a mobile communication network, wherein the relay user equipment is connected to a radio base station, wherein the relay user equipment relays communication between the remote user equipment and the radio base station and exchanges the protocol data units over sidelink bearers with the remote user equipment, the relay user equipment comprising:

a receiver, which, in operation, receives a control packet from the remote user equipment via a first sidelink bearer, the control packet including an indication of a priority associated with protocol data units transmitted by the remote user equipment via the first sidelink bearer, wherein the control packet is a Packet Data Convergence Protocol (PDCP) control PDU that includes a format indicator for indicating the priority, a processor, which, in operation, determines that the PDCP control PDU is intended for carrying the indication of the priority based on the format indicator in the PDCP control PDU, stores an association between the priority indication received in the control packet and a first radio bearer used by the relay user equipment to relay the protocol data units received from the remote user equipment to the radio base station, the processor, in operation, determines, based on the stored association, the priority according to which a protocol data unit, that was received from the radio base station via the first radio bearer, is to be transmitted to the remote user equipment, and a transmitter, which, in operation, relays the received protocol data unit to the remote user equipment using a second sidelink bearer that corresponds to the determined priority.

2. The relay user equipment according to claim 1, wherein the processor, when in operation, determines the first radio bearer to be used for relaying the protocol data unit to the radio base station based on information included in the protocol data unit received from the remote user equipment and corresponding packet filter rules stored in the relay user equipment, wherein the transmitter, when in operation, transmits the protocol data unit to the radio base station using the determined first radio bearer, and wherein the processor, when in operation, generates and stores the association between the priority indication received in the control packet and the first radio bearer only after determining the first radio bearer for a first one of a plurality of protocol data units received from the remote user equipment via the first sidelink bearer.

3. The relay user equipment according to claim 1, wherein the relay user equipment, upon receiving the protocol data unit from the radio base station, either sets up a new second sidelink bearer with the determined priority, when no sidelink bearer with the determined priority is available, or selects the second sidelink bearer corresponding to the determined priority, when a sidelink bearer with the determined priority is available, so as to relay the received protocol data unit to the remote user equipment.

4. A method for operating a relay user equipment for relaying protocol data units exchanged with a remote user equipment within a mobile communication network, wherein the relay user equipment is connected to a radio base station, wherein the relay user equipment relays communication between the remote user equipment and the radio base station and exchanges the protocol data units over sidelink bearers with the remote user equipment, the method comprising:

receiving a control packet from the remote user equipment via a first sidelink bearer, the control packet including an indication of a priority associated with protocol data units transmitted by the remote user equipment via the first sidelink bearer, wherein the control packet is a Packet Data Convergence Protocol (PDCP) control PDU that includes a format indicator for indicating the priority, determining that the PDCP control PDU is intended for carrying the indication of the priority based on the format indicator in the PDCP control PDU, storing an association between the priority indication received in the control packet and a first radio bearer used by the relay user equipment to relay the protocol data units received from the remote user equipment to the radio base station, determining, based on the stored association, the priority according to which a protocol data unit, that was received from the radio base station via the first radio bearer, should be transmitted to the remote user equipment, and relaying received protocol data unit to the remote user equipment using a second sidelink bearer that corresponds to the determined priority.

5. A remote user equipment for transmitting protocol data units to a relay user equipment connected to a radio base station within a mobile communication network, wherein the relay user equipment relays communication between the remote user equipment and the radio base station and exchanges protocol data units over sidelink bearers with the relay user equipment, the remote user equipment comprising:

a transmitter which, in operation, transmits a control packet to the relay user equipment via a first sidelink bearer, the control packet including an indication of a priority associated with protocol data units transmitted by the remote user equipment via the first sidelink bearer to the relay user equipment, wherein the control packet is a Packet Data Convergence Protocol (PDCP) control PDU that includes a format indicator for indicating the priority and the format indicator is usable by the relay user equipment for determining that the PDCP control PDU is intended for carrying the indication of the priority.

6. The remote user equipment according to claim 5, wherein the transmitter, when in operation, transmits the control packet to the relay user equipment when the priority of a protocol data unit to be transmitted to the relay user equipment via the first sidelink bearer changes.

7. The remote user equipment according to claim 6, comprising:

a processor, which, in operation, determines that a protocol data unit is to be transmitted to the relay user equipment, the protocol data unit being associated with a priority, and wherein the processor, when in operation, determines that there is no sidelink bearer that corresponds to the priority with which the protocol data unit is to be transmitted to the relay user equipment, wherein upon this determination, the processor sets up a sidelink bearer to the relay user equipment corresponding to said priority, and the transmitter transmits the control packet including the priority to the relay user equipment via the set-up sidelink bearer before transmitting the protocol data unit to the relay user equipment via the set-up sidelink bearer.

8. A method for operating a remote user equipment for transmitting protocol data units to a relay user equipment connected to a radio base station within a mobile communication network, wherein the relay user equipment relays communication between the remote user equipment and the radio base station and exchanges protocol data units over sidelink bearers with the relay user equipment, the method comprising:

transmitting a control packet to the relay user equipment via a first sidelink bearer, the control packet including an indication of a priority associated with protocol data units transmitted by the remote user equipment via the first sidelink bearer to the relay user equipment, wherein the control packet is a Packet Data Convergence Protocol (PDCP) control PDU that includes a format indicator for indicating the priority and the format indicator is usable by the relay user equipment for determining that the PDCP control PDU is intended for carrying the indication of the priority.

9. A relay user equipment for relaying protocol data units exchanged with a remote user equipment within a mobile communication network, wherein the relay user equipment is connected to a radio base station, wherein the relay user equipment relays communication between the remote user equipment and the radio base station and exchanges the protocol data units over sidelink bearers with the remote user equipment, the relay user equipment comprising:

a receiver, which, in operation, receives an application-level signaling message associated with a predetermined priority, a processor, which, in operation, based on the predetermined priority, determines to use a default bearer to transmit the application-level signaling message to the radio base station and to increase the priority with which the application-level signaling message is to be transmitted to the radio base station, and a transmitter, which, in operation, transmits the application-level signaling message to the radio base station via the default bearer with the increased priority.

10. The relay user equipment according to claim 9, wherein the processor, when in operation, does not store the predetermined priority in association with the default bearer, the processor, when in operation, determines a sidelink bearer to be used for transmitting a further application-level signaling message, received from the radio base station via the default bearer, to the remote user equipment, wherein the determined sidelink bearer has a high priority, and the transmitter, when in operation, transmits the further application-level signaling message to the remote user equipment using the determined sidelink bearer.

11. The relay user equipment according to claim 9, wherein a dedicated radio bearer is set up between the relay user equipment and the radio base station to be used for transmitting further application-level signaling messages, wherein upon setting up the dedicated radio bearer, the relay user equipment transmits an application-level signaling message to the remote user equipment using a further sidelink bearer associated with a further priority different from the predetermined priority.

12. A method for operating a relay user equipment for relaying protocol data units exchanged with a remote user equipment within a mobile communication network, wherein the relay user equipment is connected to a radio base station, wherein the relay user equipment relays communication between the remote user equipment and the radio base station and exchanges the protocol data units over sidelink bearers with the remote user equipment, the method comprising:

receiving an application-level signaling message associated with a predetermined priority, determining, based on the predetermined priority, to use a default bearer to transmit the application-level signaling message to the radio base station and to increase the priority with which the application-level signaling message is to be transmitted to the radio base station, and transmitting the application-level signaling message to the radio base station via the default bearer with the increased priority.

13. A remote user equipment for transmitting protocol data units to a relay user equipment connected to a radio base station within a mobile communication network, wherein the relay user equipment relays communication between the remote user equipment and the radio base station and exchanges protocol data units over sidelink bearers with the remote user equipment, the remote user equipment comprising:

a processor, which, in operation, determines a predetermined priority to be associated with an application-level signaling message to be transmitted to the relay user equipment, and a transmitter, which, in operation, transmits the application-level signaling message and the associated predetermined priority to the relay user equipment so as to indicate to the relay user equipment to increase the priority with which the application-level signaling message is to be transmitted to the radio base station.

14. A method for operating a remote user equipment for transmitting protocol data units to a relay user equipment connected to a radio base station within a mobile communication network, wherein the relay user equipment relays communication between the remote user equipment and the radio base station and exchanges protocol data units over sidelink bearers with the remote user equipment, the method comprising:

determining a predetermined priority to be associated with an application-level signaling message to be transmitted to the relay user equipment, and transmitting the application-level signaling message and the associated predetermined priority to the relay user equipment so as to indicate to the relay user equipment to increase the priority with which the application-level signaling message is to be transmitted to the radio base station.

* * * * *